(12) United States Patent
Giuseppone et al.

(10) Patent No.: US 10,983,271 B2
(45) Date of Patent: Apr. 20, 2021

(54) OPTICAL PLASMONIC CONDUCTORS COMPRISING ONE OR MORE FIBRILLAR ORGANIC SUPRAMOLECULAR SPECIES

(71) Applicants: CENTRE NATIONAL DE LA RECHERCHE SCIENTIFIQUE, Paris (FR); UNIVERSITÉ DE STRASBOURG, Strasbourg (FR)

(72) Inventors: Nicolas Giuseppone, Hangenbieten (FR); Joseph John Armao, IV, San Diego, CA (US); Gero Decher, Kehl-Marlen (DE)

(73) Assignees: CENTRE NATIONAL DE LA RECHERCHE SCIENTIFIQUE, Paris (FR); UNIVERSITÉ DE STRASBOURG, Strasbourg (FR)

( * ) Notice: Subject to any disclaimer, the term of this patent is extended or adjusted under 35 U.S.C. 154(b) by 0 days.

(21) Appl. No.: 16/073,639

(22) PCT Filed: Jan. 27, 2017

(86) PCT No.: PCT/EP2017/051822
§ 371 (c)(1),
(2) Date: Jul. 27, 2018

(87) PCT Pub. No.: WO2017/129776
PCT Pub. Date: Aug. 3, 2017

(65) Prior Publication Data
US 2019/0285795 A1 Sep. 19, 2019

(30) Foreign Application Priority Data
Jan. 27, 2016 (EP) .................... 16305075

(51) Int. Cl.
| | |
|---|---|
| *G02B 6/12* | (2006.01) |
| *G02B 6/10* | (2006.01) |
| *G02B 6/122* | (2006.01) |
| *B82Y 20/00* | (2011.01) |

(52) U.S. Cl.
CPC ........... *G02B 6/107* (2013.01); *G02B 6/1226* (2013.01); *B82Y 20/00* (2013.01); *G02B 2006/12069* (2013.01)

(58) Field of Classification Search
CPC ........ B82Y 20/00; B82Y 40/00; G02B 5/008; G02B 6/1226
USPC .................. 385/14, 141–145, 147
See application file for complete search history.

(56) References Cited

U.S. PATENT DOCUMENTS

| | | | | |
|---|---|---|---|---|
| 9,285,610 | B2 * | 3/2016 | Mandelbaum | ........ G02F 1/0018 |
| 9,845,237 | B2 * | 12/2017 | Tseng | ........................ B82B 3/00 |
| 2009/0294692 | A1 * | 12/2009 | Bourke, Jr. | ............... A23L 2/50 |
| | | | | 250/459.1 |

(Continued)

OTHER PUBLICATIONS

"Supramolecular self-assemblies as functional nanomaterials" by Busseron et al, Nanoscale, vol. 5, pp. 7098-7140, 2013.*

(Continued)

*Primary Examiner* — Robert Tavlykaev
(74) *Attorney, Agent, or Firm* — Kenealy Vaidya LLP

(57) ABSTRACT

Some embodiments are directed to optical conductors comprising one or more fibrillar organic supramolecular species including an association of triarylamines, methods of preparation and applications thereof as optical and plasmonic waveguides.

18 Claims, 4 Drawing Sheets

(56) References Cited

U.S. PATENT DOCUMENTS

2014/0170214 A1* 6/2014 Scherman ............ C08G 83/008
424/451
2015/0155681 A1* 6/2015 Ozyilmaz ........... H01S 3/06791
372/6

OTHER PUBLICATIONS

"Supramolecular Self-Assembly and Radical Kinetics in Conducting Self-Replicating Nanowires" by Nyrkova et al, ACS Nano, vol. 8, No. 10, pp. 10111-10124, 2014.*
"Healable Supramolecular Polymers as Organic Metals" by Armao et al, Journal of the American Chemical Society, vol. 136, pp. 11382-11388, 2014.*
"Control over nanostructures and associated mesomorphic properties of doped self-assembled triarylamine liquid crystals" by Domoto et al, Chemistry, vol. 21, pp. 1938-1948, 2015.*
"Electrochemical and optical characterization of triarylamine functionalized gold nanoparticles" by Muller et al, Langmuir, vol. 27, pp. 5029-5039, 2011.*
"Long-range energy transport in single supramolecular nanofibres at room temperature" by Haedler et al, Nature, vol. 523, pp. 196-199, Jul. 2015.*
"Conducting Triarylamine Supramolecular Polymers: From Electronics to Plasnnonics" by J. Armao, PhD thesis, Sep. 23, 2015.*
"Two-Dimensional Self-Organization of Gold Nanoparticles on Supramolecular Aggregates" by Chattopadhyay et al, Journal of Nanoscience and Nanotechnology, vol. 6, 1847-1849. (Year: 2006).*
"Nanoparticle Cluster Arrays for High-Performance SERS through Directed Self-Assembly on Flat Substrates and on Optical Fibers" by Yap et al, ACS Nano, vol. 6, No. 3, pp. 2056-2070. (Year: 2012).*
"Light-triggered self-assembly of triarylamine-based nanospheres" by Moulin et al, Nanoscale, vol. 4, pp. 6748-6751. (Year: 2012).*
"Ag-DNA Emitter: Metal Nanorod or Supramolecular Complex?" by Ramazanov et al, J. Phys. Chem. Lett., vol. 7, pp. 3560-3566. (Year: 2016).*
"Halogen Bonding: A Supramolecular Entry for Assembling Nanoparticles" by Shirman et al, Angew. Chem., vol. 122, 938-941. (Year: 2010).*
"Supramolecular Approach to Gold Nanoparticle/Triruthenium Cluster Hybrid Materials and Interfaces" by Tonna et al, Eur. J. Inorg. Chem., pp. 1640-1648. (Year: 2011).*
"Block-Copolymer-Based Plasmonic Nanostructures" by Mistark et al, ACS Nano, vol. 3, No. 12, pp. 3987-3992. (Year: 2009).*
Faramarzi, V., et al., "Light-triggered self-construction of supramolecular organic nanowires as metallic interconnects," Nature Chem. 2012;4:485-490.
Armao, J. J., et al., "Healable Supramolecular Polymers as Organic Metals," J. Am. Chem. Soc. 2014;136:11382-11388.
Akande, A., et al., "First principles study of the structural, electronic, and transport properties of triarylamine-based nanowires," J. Chem. Phys. 2014;140:074301-1-064301-10.
Moulin, E., et al., "The Hierarchical Self-Assembly of Charge Nanocarriers: A Highly Cooperative Process Promoted by Visible Light," Angew. Chem. Int. Ed. 2010;49:6974-6978.
Zyga, L., "Highly conductive organic metal looks promising for disposable electronic devices," Internet Citation, Aug. 19, 2014, pp. 1-3, XP00275769, retrieved from the Internet: URL:http://phys.org/news/2014-08-highly-metal-disposable-electronic-devices.html [retrieved on Jul. 6, 2016].
International Search Report and Written Opinion for PCT Patent App. No. PCT/EP2017/051822 (dated Mar. 30, 2017).

* cited by examiner

OPTICAL PLASMONIC CONDUCTORS COMPRISING ONE OR MORE FIBRILLAR ORGANIC SUPRAMOLECULAR SPECIES

CROSS REFERENCE TO RELATED APPLICATIONS

This application is a national phase filing under 35 C.F.R. § 371 of and claims priority to PCT Patent Application No. PCT/EP2017/051822, filed on Jan. 27, 2017, which claims the priority benefit under 35 U.S.C. § 119 of European Patent Application No. 16305075.0, filed on Jan. 27, 2016, the contents of each of which are hereby incorporated in their entireties by reference.

BACKGROUND

Some embodiments relate to optical conductors including one or more fibrillar organic supramolecular species including or consisting of an association of triarylamines, methods of preparation and applications thereof, notably as optical and plasmonic waveguides.

Organic materials have become increasingly investigated for their applications in photonics. The dominant waveguiding mechanism is the photoluminescence mechanism, whereby an incident laser induces an excited state in the molecules which then, due to the close packing of the chromophoric part of the molecule, leads to energy transfer in the form of exciton-polaritons along the coherently stacked structures. Such a mechanism is strongly wavelength dependent and only a few examples of energy transport over 10 nanometers have been reported. Meanwhile, metallic nanostructures such as gold nanowires have been demonstrated to produce optical waveguiding effects due to plasmonic coupling, coupling between incident light and metallic electrons (Lal, S.; Hafner, J. H.; Halas, N. J.; Link, S.; Nordlander, P. *Accounts of Chemical Research* 2012, 45, (11), 1887-1895). Indeed, metallic nanostructures are the subject of intense research efforts towards light harvesting and energy transport.

Metallic nanoparticles exhibit localized surface plasmon resonances in the presence of electromagnetic fields because free electrons in their conduction-band are set in coherent oscillations at the interface with a dielectric. Transmission of the induced displacement current, guided by plasmonic modes, provides the basis to achieve optical nanocircuits. Theoretical studies predict that nanowires including or consisting of a metallic core surrounded by a dielectric sheath may act as efficient plasmonic connections between metallic nanoparticles. Indeed, waveguiding beyond the diffraction limit is made possible by the increased localization of plasmonic modes as the nanowire's diameter is decreased to the nanometer range. It has been shown that, although the transmission losses increase as the core diameter decreases at this scale, it does not interfere within a small transmission length. The coupling of these modes with the emission of quantum dots has also been demonstrated. However, in spite of their interest, the use of <20 nm diameter nanowires as interconnects in minimal plasmonic circuits remains elusive, likely because of the experimental challenge in manipulating objects at this scale by top-down strategies. It is for the same reason that organic nanowires have increasingly become an alternative solution for electronics with possible control over their placement and properties for device applications (Min, S.-Y.; Kim, T.-S.; Kim, B. J.; Cho, H.; Noh, Y.-Y.; Yang, H.; Cho, J. H.; Lee, T.-W. Large-scale Organic Nanowire Lithography and Electronics. *Nature Commun.* 2013, 4, 1773; Cho, H.; Min, S.-Y.; Lee, T.-W. Electrospun Organic Nanofiber Electronics and Photonics. *Macromol. Mater. Eng.* 2013, 298, 475-486; Min, S.-Y.; Kim, T.-S.; Lee, Y.; Cho, H.; Xu, W.; Lee, T.-W. Organic Nanowire Fabrication and Device Applications. *Small* 2015, 11, 45-62). Additionally, common top-down methods in plasmonics, such as lithography, produces polycrystalline metallic nanostructures, which can severely hinder their functioning as waveguides (Ditlbacher, H.; Hohenau, A.; Wagner, D.; Kreibig, U.; Rogers, M.; Hofer, F.; Aussenegg, F. R.; Krenn, J. R. Silver Nanowires as Surface Plasmon Resonators. *Phys. Rev. Lett.* 2005, 95, 257403)

SUMMARY

Some embodiments are directed to new plasmonic compounds and device(s) using same. Accordingly, some embodiments are directed to new compounds useful as plasmonic waveguide(s).

Some embodiments are directed to new optical conductors and/or optical devices. Accordingly, some embodiments are directed to new compounds useful as optical waveguide(s).

Some embodiments are directed to new hybrid organic-metal devices.

Some embodiments are directed to a method for preparing optical conductors.

Previously, the ability of triarylamine molecules which are substituted with a single hydrogen-bonding amide groups to undergo light-triggered self-assembly in solution as the radical cation drives the association of the molecular units together has been demonstrated (Moulin, E.; Niess, F.; Maaloum, M.; Buhler, E.; Nyrkova, I.; Giuseppone, N. *Angewandte Chemie International Edition* 2010, 49, (39), 6974-6978; Nyrkova, I.; Moulin, E.; Armao, J. J.; Maaloum, M.; Heinrich, B.; Rawiso, M.; Niess, F.; Cid, J.-J.; Jouault, N.; Buhler, E.; Semenov, A. N.; Giuseppone, N. *ACS Nano* 2014, 8, (10), 10111-10124). Also, tris-amide triarylamine (TATA) compounds have demonstrated solution-phase self-assembly into nanowires which readily form gels with unique self-healing and metallic properties (Armao, J. J.; Maaloum, M.; Ellis, T.; Fuks, G.; Rawiso, M.; Moulin, E.; Giuseppone, N. *Journal of the American Chemical Society* 2014, 136, (32), 11382-11388). Here, amide groups drive the hydrogen bonding between molecules stacked on top of each other giving rise to a helical nanofiber structure. These previous works have demonstrated that self-assembled triarylamines can act as organic metals due to efficient overlap of their core units while stacking (Armao, J. J.; Maaloum, M.; Ellis, T.; Fuks, G.; Rawiso, M.; Moulin, E.; Giuseppone, N. *Journal of the American Chemical Society* 2014, 136, (32), 11382-11388).

Such structures are also the subject-matter of the PCT application WO2012/093210 (and related patents), which is incorporated here by reference.

However, it was discovered by the applicants that fibrillar organic supramolecular species including or consisting of an association of triarylamines present optical conducting properties and especially plasmonic properties.

Accordingly, some embodiments relate to optical conductor including one or more fibrillar organic supramolecular species including or consisting of an association of triarylamines.

Fibrillar organic supramolecular species including or consisting of an association of triarylamines according to some embodiments are useful to prepare optical conductors and optical devices. Accordingly, some embodiments relate to the use of one or more fibrillar organic supramolecular species including or consisting of an association of triarylamines as optical waveguide.

Fibrillar organic supramolecular species including or consisting of an association of triarylamines according to some embodiments are useful as optical waveguide or as plasmonic waveguide(s). Accordingly, some embodiments relate to the use of one or more fibrillar organic supramolecular species including or consisting of an association of triarylamines as plasmonic waveguide(s).

Some embodiments also relate to crystals of one or more fibrillar organic supramolecular species including or consisting of an association of triarylamines.

Some embodiments also relate to nanoparticles of one or more metals or alloys thereof, for example gold nanoparticles, the nanoparticles forming nanoclusters, the nanoclusters being interconnected by the fibrillar organic supramolecular species, advantageously or preferably oriented in one or more parallel bundles of fibrillar organic supramolecular species.

Some embodiments also relate to hybrid organic-metal device including an optical conductor as defined in some embodiments.

Some embodiments also relate to an optical circuit or solar energy conversion device including an optical conductor as defined in some embodiments.

Some embodiments also relate to a method for preparing an optical conductor including one or more fibrillar organic supramolecular species including or consisting of an association of triarylamines as defined in some embodiments.

DETAILED DESCRIPTION OF EXEMPLARY EMBODIMENTS

Some embodiments relate to the field of optical devices, for example optoelectronic devices, such as light emitting diodes (LEDs and OLEDs), field effect transistors (FETs and OFETs) and photovoltaic devices such as solar cells.

Optical devices are mainly devices receiving one or more electromagnetic waves, typically light or solar radiations, on one or more areas, more generally a surface thereof, and transmitting or conducting one or more electromagnetic waves to one or more other areas of the device. Such conduction or transmission may occur through optical or plasmonic connections. The term "optical conduction" and "optical transmission" mean according to some embodiments guiding an optic electromagnetic wave from one to another area, especially through a material, typically a layer of material.

In particular, some embodiments relate to optical nanocircuits including one or more fibrillar organic supramolecular species according to some embodiments. More specifically, some embodiments relate to optical nanocircuits including one or more fibrillar organic supramolecular species according to some embodiments conducting or transmitting plasmonic energy.

According to an embodiment, the triarylamines of formula (I) are compounds wherein each of the groups -$A^1$- and -$A^2$- is a group —O—.

Moreover, it proves to be generally of interest that in the triarylamines of formula (I), each of the groups $R^1$ and $R^2$ independently represents:
  a benzyl group; or
  an advantageously linear alkyl group typically including from 6 to 18 carbon atoms, advantageously or preferably from 7 to 10 carbon atoms.

Thus, according to an interesting embodiment, the triarylamines of formula (I) may for example fit the formula (Ia) below:

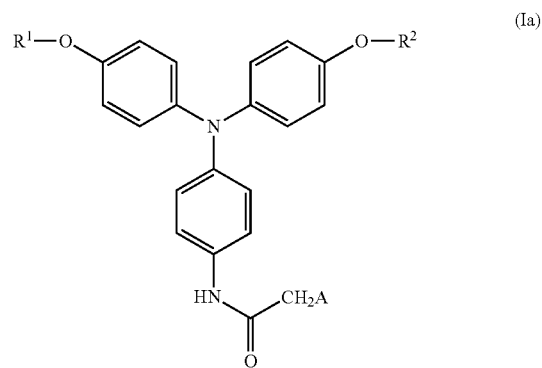

wherein:
  each of the groups $R^1$ and $R^2$, either identical or different (and advantageously or preferably identical) have one of the aforementioned meanings and advantageously or preferably designates a benzyl group or else an advantageously linear alkyl group, including from 6 to 18, for example 7 to 10, and notably 8 carbon atoms;
  A is a hydrogen group —H; a halogen group, for example a group —Cl; or else an alkyl group typically including from 1 to 8 carbon atoms (for example, 5, 6, or 7 carbon atoms).

Triarylamines of some embodiments notably include, in a non-limiting way, the compounds fitting formula (Ia) above, wherein $R^1$, $R^2$, and A have one of the following meanings:
  $R^1=R^2=C_8H_{17}$ (linear) and A=Cl; or
  $R^1=R^2=C_8H_{17}$ (linear) and A=H; or
  $R^1=R^2=C_8H_{17}$ (linear) and A=$C_6H_{13}$ or
  $R^1=R^2$=benzyl and A=H; or
  $R^1=R^2$=benzyl and A=Cl.

According to one embodiment, the triarylamines are of formula (I) below:

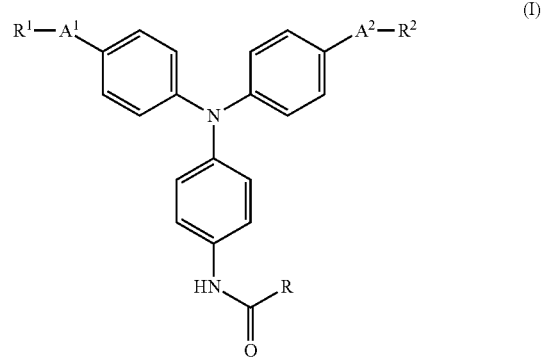

wherein:
  each of the groups -A1- and -A2-, either identical or different, designates a simple covalent bond or else a group —O—, —S—, —NH— —NH(C=O)—, or —NR3-;
  each of the groups R1, R2 and R3, either identical or different, independently represents an atom group, the atom group including advantageously or preferably:

an aromatic group; or a hydrocarbon chain including from 1 to 30 carbon atoms; or a polyethylene glycol chain; and R is a terminating group.

Possible substituents are selected for example among the following substituents: halogen atoms (F, Br or Cl, in particular), linear or branched, saturated or unsaturated, hydrocarbon chain advantageously including from 1 to 10 carbon atoms, functional groups such as for example, —OH, —SH, —CHO, —COOH, —COOR', —CONH$_2$, —CONHR', —OR', wherein R' is a linear or branched, saturated or unsaturated, hydrocarbon chain advantageously including from 1 to 10 carbon atoms, an aromatic group optionally substituted and optionally containing one or several heteroatoms selected from N, O or S.

Carbon atoms may be chiral atoms thereby providing enantiomers of the structure.

An aromatic group according to some embodiments include a polyaromatic group and combinations of aromatic groups via non-aromatic atom links. Such groups are optionally substituted.

R is more advantageously or preferably an alkyl group, optionally halogenated, advantageously or preferably including from 1 to 8 carbon atoms.

In one embodiment, the triarylamines are of formula (II) below:

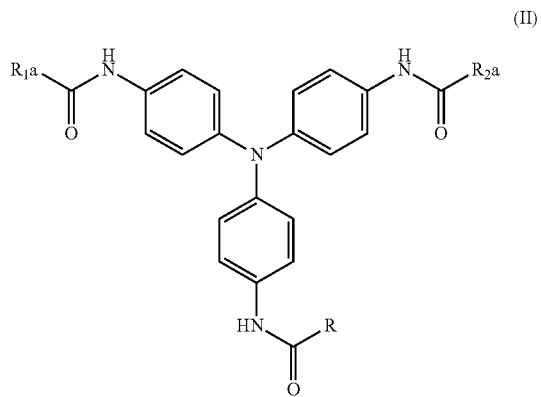

(II)

wherein:

each of the groups R1a and R2a, either identical or different, independently represents an atom group, the atom group including advantageously or preferably:

an aromatic group; or a hydrocarbon chain including from 1 to 30 carbon atoms; or a polyethylene glycol chain; and R is a terminating group.

In one embodiment, the groups R, R1a- and R2a of formula (II), either identical or different, independently represents a hydrocarbon chain including from 1 to 30 carbon atoms.

More specifically; in the compound of formula (II), the groups R, R1a- and R2a of formula (II), either identical or different, independently may represent linear or branched hydrocarbon chain including from 4 to 30 carbon atoms, typically from 4 to 22 carbon atoms.

More specifically; in the compound of formula (II), the groups R, R1a- and R2a of formula (II), either identical or different, independently may represent linear $C_4H_9$, $C_5H_{11}$, $C_6H_{13}$, $C_7H_{15}$, $C_5H_{17}$, $C_9H_{19}$, $C_5H_{17}$, $C_{10}H_{21}$, $C_{11}H_{23}$, $C_{12}H_{25}$, or $C_{13}H_{27}$.

In one embodiment of formula (I) or (II), R is a terminating group, which advantageously or preferably is a linear or branched, saturated or unsaturated, hydrocarbon chain, advantageously including from 1 to 10 carbon atoms, optionally substituted and optionally interrupted with one or several heteroatoms selected from N, O or S.

In one embodiment of formula, the groups R, R1a- and R2a of formula (II), either identical or different, independently represents a hydrocarbon chain including from 1 to 10 carbon atoms.

In a specific embodiment, the groups R, R1a- and R2a of formula (II), either identical or different, independently represents a hydrocarbon chain including from 1 to 3 carbon atoms, advantageously or preferably a methyl group.

More specifically; in the compound of formula (II), the groups R, R1a- and R2a of formula (II), either identical or different, independently may represent linear $C_1H_3$, $C_2H_5$, or $C_3H_7$.

Such triarylamines compound are present in the form of nanofibers or in other words of fibrillar organic supramolecular species.

A method for preparing these compounds was notably described in *Angew. Chem. Int Ed.*, Vol. 49, pp. 6974-6978 (2010), which is incorporated here by reference.

The fibrillar organic supramolecular species typically form nanofibers which may be arranged in a bundle of nanofibers.

According to one embodiment, the presently disclosed subject matter relates to crystals including the fibrillar organic supramolecular species.

According to one embodiment, the presently disclosed subject matter relates to crystals including the fibrillar organic supramolecular species presenting hydrogen bonding amide groups in the molecular crystals. According to one embodiment, the presently disclosed subject matter relates to crystals including the fibrillar organic supramolecular species presenting bonding between the aromatic groups in the molecular crystals.

In one embodiment, the crystals include fibrillar organic supramolecular species including or consisting of compounds of the formula (I) or (II) wherein each of the groups R1a and R2a, either identical or different, independently represents a hydrocarbon chain including from 1 to 10 carbon atoms, for example from 1 to 5 carbon atoms, typically 1 carbon atom.

In one specific embodiment, the crystals include fibrillar organic supramolecular species arranged in columns displaying an alternating AB type stacking, for example having a 60° dihedral angle, or about.

In one specific embodiment, the crystals include oxidized fibrillar organic supramolecular species. Advantageously or preferably, such oxidized fibrillar organic supramolecular species present a low resistance, advantageously or preferably a resistance of less than 100 MΩ, advantageous or preferably less than 10 MΩ, advantageously or preferably less than 1 MΩ. Advantageously or preferably, such oxidized fibrillar organic supramolecular species present a low resistance, advantageously or preferably a resistance of less than 100 kΩ, advantageously or preferably less than 10 kΩ, advantageously or preferably less than 1 kΩ.

In one specific embodiment, the crystals include oxidized fibrillar organic supramolecular species display linear Ohmic behavior, for example when sweeping the voltage potential between −1 V and +1 V when there are placed in between electrodes.

In one embodiment, the lengths of the crystals vary from 4 μm to 40 μm.

In one embodiment, the average width of the crystals varies from 1 um to 3 um.

According to one embodiment, the crystals present a waveguiding behavior, more advantageously or preferably a plasmonic waveguiding behavior. In one specific embodiment, the crystals include oxidized fibrillar organic supramolecular species and present a waveguiding behavior.

In one specific embodiment, the crystals present a multimodal waveguiding behavior. In one specific embodiment, the crystals include oxidized fibrillar organic supramolecular species and present a multimodal waveguiding behavior.

In one specific embodiment, the crystals include non-oxidized fibrillar organic supramolecular species. In one specific embodiment, the crystals include unoxidized fibrillar organic supramolecular species and present passive optical waveguiding behavior.

In one alternative, the crystals from a layer in contact with a layer of dye. In one specific embodiment, the crystals from a layer in contact with a layer of dye and present the passive optical waveguiding behavior.

In one alternative, the crystals present a birefringence.

In one specific embodiment, the crystals present an orientation of the molecules in the crystal along the long axis of the crystal: the stacking direction is parallel to the long axis of the crystal.

In one embodiment, the crystals form a plasmonic layer.

According to one embodiment the crystals are in the form of a layer in contact with a layer including one or more dyes. Advantageously or preferably the layer of dyes is placed on the top of the crystal layer respect to an incident light.

According to one aspect, some embodiments relate to a method for preparing an optical conductor including crystals of one or more fibrillar organic supramolecular species including or consisting of an association of triarylamines as defined in some embodiments, the method including (i) preparing a solution including triarylamines and at least one solvent, advantageously or preferably a mixture of solvents, (ii) preparing and crystallizing fibrillar organic supramolecular species including or consisting of an association of triarylamines by evaporation of at least one solvent thereby preparing crystals of one or more fibrillar organic supramolecular species.

In one embodiment, the crystals may be prepared by dissolving triarylamines in a mixture of solvents ensuring the absence of any self-assembly.

In one embodiment, in the mixture of solvents a first solvent presents a lower boiling point than a second solvent and the first solvent ensures the absence of any self-assembly of triarylamines into fibrillar organic supramolecular species and the second enables the assembly of triarylamines into fibrillar organic supramolecular species.

In one specific embodiment the first solvent is methanol.

In one specific embodiment, the second solvent is toluene.

In one specific embodiment, the mixture of solvent is a mixture including methanol and toluene, for example from 1/3 to 3/1 MeOH/Toluene in % by volume of the solvent mixture, advantageously or preferably a 75% MeOH/25% toluene mixture.

Advantageously the second solvent enables the assembly of triarylamines into fibrillar organic supramolecular species by enabling a higher concentration of triarylamines.

In one embodiment, when the triarylamines are in a solvent mixture solution, crystallization is performed by evaporation, advantageously or preferably slow evaporation, of the first solvent which advantageously or preferably enables the assembly of triarylamines into fibrillar organic supramolecular species and crystallization thereof.

In one embodiment the crystals are formed by parallel nanofibers or fibrillar organic supramolecular species.

In one embodiment, bundles of nanofibers are formed by parallel fibrillar organic supramolecular species.

In one advantageous or preferred embodiment, bundles of nanofibers are essentially parallel each other, at least between interconnected nanoparticles or nanoclusters.

According to one aspect, some embodiments relate to a parallel nanofibers or parallel bundles of fibrillar organic supramolecular species as defined in some embodiments.

In particular, some embodiments relate to nanoparticles of one or more metals or alloys thereof, for example gold nanoparticles, the nanoparticles forming nanoclusters, the nanoclusters being interconnected by the fibrillar organic supramolecular species, advantageously or preferably oriented in one or more parallel bundles of fibrillar organic supramolecular species.

In one embodiment, the presently disclosed subject matter relates to an optical conductor including nanoparticles of one or more metals or alloys thereof, for example gold nanoparticles, the nanoparticles forming nanoclusters, the nanoclusters being interconnected by the fibrillar organic supramolecular species, advantageously or preferably oriented in one or more parallel bundles of fibrillar organic supramolecular species.

In one embodiment, the nanoclusters are deposited on a substrate. In one embodiment, the nanoclusters are deposited on a layer of polymer, advantageously or preferably on an hexagonal amphiphilic polymer, such as for example PS-P2VP, optionally deposited on a substrate. Advantageously or preferably, the nanoparticles are deposited on the hydrophilic surface of an amphiphilic polymer.

In one embodiment the substrate is a glass or silicon substrate.

In one embodiment the nanocluster is formed by gold nanoparticles, for example nanoclusters including about 10 nanoparticles per nanoclusters.

Advantageously or preferably, the nanoparticles include a layer, advantageously or preferably a monolayer of triarylamines.

In one embodiment, the nanoparticles include a layer, advantageously or preferably a monolayer of triarylamines of formula (II) wherein groups R, R1a- and R2a include a terminal thiol function.

In one embodiment, the nanoparticles include a layer, advantageously or preferably a monolayer of triarylamines of formula (II) wherein groups R, R1a- and R2a include or consist of a linear alkyl chain, advantageously or preferably a C1-C10 alkyl chain, for example a C4-C6 alkyl chain, with a terminal thiol function.

In one embodiment, the nanoparticles include a layer, advantageously or preferably a monolayer of triarylamines with a parallel orientation respective to the surface of the nanoparticles, wherein the density of the parallel-oriented triarylamines is from 0.1 to 2 molecules $nm^{-2}$, advantageously or preferably from 0.5 to 1 molecule $nm^{-2}$.

In one embodiment, the nanoparticles include a layer, advantageously or preferably a monolayer of triarylamines having a height of less than 1 nm, for example from 0.1 to 0.8 nm, typically 0.5 nm.

Advantageously or preferably, in the parallel orientation of the triarylamines on the nanoparticles, the triarylamines include thiols attached to the nanoparticles. In one specific embodiment, in the parallel orientation of triarylamines including 3 terminal thiol functions on the nanoparticles, the triarylamines include thiols attached to the nanoparticles.

In one embodiment, the fibrillar organic supramolecular species form helical nanofibers In one embodiment, the fibrillar organic supramolecular species have a length of 10 to 500 nm, for example from 50 to 200 nm, for example 100 nm.

In one embodiment, the nanoparticles or nanoclusters of nanoparticles are edge-to-edge distance of 10 to 500 nm, for example from 50 to 200 nm, for example 100 nm between nearest neighbors.

In one embodiment, the height of the nanoclusters of nanoparticles is of 10 to 200 nm, for example from 20 to 70 nm, typically of about 50 nm.

In one embodiment, the fibrillar organic supramolecular species have a diameter of 0.1 to 10 nm, for example from 0.5 to 5 nm, for example of about 1 nm.

In one embodiment, the average ratio of fibrillar organic supramolecular species on the nanoparticles is of 5 to 25%, typically of 10 to 15% of connected bundles of nanofibers per nanoparticle.

In one embodiment, the average ratio of fibrillar organic supramolecular species on a nanocluster of nanoparticles is from 1 to 2 bundles of nanofibers per nanoclusters, for example of 1.25 bundles of nanofibers per nanoclusters.

In one embodiment, functionalized nanoparticles with doped nanofibers displays an enhancement of Raman modes at 1175 $cm^{-1}$ and 1600 $cm^{-1}$ with respect to unfunctionalized nanoparticles.

In one embodiment, fibrillar organic supramolecular species present a half-filled polaronic band (HFPB) at −4.5 eV.

In one embodiment, red-shift of the resonance frequency of the oscillator ($\omega$) of the plasmonic layer including fibrillar organic supramolecular species is between 600 nm and 650 nm, for example around 620 nm or advantageously or preferably around 630 nm. In one embodiment, optical conductivity ($\sigma_r$) of the plasmonic layer including fibrillar organic supramolecular species is higher than 1000 $\Omega^{-1} \cdot cm^{-1}$, advantageously or preferably higher than 2000 $\Omega^{-1} \cdot cm^{-1}$, advantageously or preferably higher than 3000 $\Omega^{-1} \cdot cm^{-1}$ at a wavelength of 650 nm.

Surprisingly, optical conductivity ($\sigma_r$) of the plasmonic layer including fibrillar organic supramolecular species is of is higher than 3500 $\Omega^{-1} \cdot cm^{-1}$, advantageously or preferably higher than 4000 $\Omega^{-1} \cdot cm^{-1}$ at a wavelength of 650 nm.

According to one aspect, some embodiments relate to a method for preparing an optical conductor including one or more fibrillar organic supramolecular species including or consisting of an association of triarylamines as defined in some embodiments, the method including (i) preparing nanoclusters of metallic nanoparticles, the metallic nanoparticles including one or more metals or alloys thereof, for example gold nanoparticles, (ii) reacting metallic nanoparticles with triarylamines thereby forming functionalized metallic nanoparticles presenting at least partially on the outer surface a layer, advantageously or preferably a monolayer, of triarylamines oriented parallel to the surface of the metallic nanoparticles, (iii) preparing fibrillar organic supramolecular species including or consisting of an association of triarylamines, and (iv) interconnecting the functionalized metallic nanoparticles by fibrillar organic supramolecular species.

Parallel orientation of the nanofibers or of the bundles of nanofibers may be obtained by orienting the monolayer of triarylamines parallel to the surface of the metallic nanoparticles.

In one embodiment, step (i) of preparing nanoclusters may include plasma treatment. In one embodiment, step (i) includes the plasma treatment of nanoparticles to clean the surface thereof. For example the plasma is an oxygen plasma.

In one embodiment, the nanoclusters are deposited on a substrate, for example a glass or silicon substrate.

In one embodiment, step (ii) includes reacting nanoparticles with triarylamines including terminal thiol functions.

In an alternative, step (ii) includes forming a layer, advantageously or preferably a monolayer, of triarylamines starting from a solution of 0.1 µM to 10 mM, advantageously or preferably from 1 to 100 µM, for example from 1 to 20 µM, for example about 10 µM, triarylamines. Advantageously the triarylamines concentration provides the parallel orientation on the nanoparticles.

In an alternative, in step (ii), the triarylamines are in a solvent avoiding self-aggregation for example by forming intermolecular hydrogen bonds with triarylamines, for example an alcohol, such as for example methanol.

Advantageously or preferably, the thermodynamic of step (ii) provides parallel orientation of the triarylamines on the nanoparticles.

In one embodiment, step (iii) includes preparing independently fibrillar organic supramolecular species including or consisting of an association of triarylamines. The fibrillar organic supramolecular species may be prepared for example as described in Moulin, E.; et al. The Hierarchical Self-Assembly of Charge Nanocarriers: A Highly Cooperative Process Promoted by Visible Light. *Angew. Chem. Int. Ed.* 2010, 49, 6974-6978; Faramarzi, V. et al. Light-triggered Self-construction of Supramolecular Organic Nanowires as Metallic Interconnects. *Nature Chem.* 2012, 4, 485-490; or Nyrkova, I. et al. Supramolecular Self-Assembly and Radical Kinetics in Conducting Self-Replicating Nanowires. *ACS Nano* 2014, 8, 10111-10124, which are incorporated here by reference.

In one embodiment, step (iii) includes reacting the layer of triarylamines grafted on nanoparticles with a solution of fibrillar organic supramolecular species including or consisting of an association of triarylamines.

In one embodiment, step (iii) includes preparing simultaneously fibrillar organic supramolecular species including or consisting of an association of triarylamines. In such an embodiment, for example, nanoparticles obtained at step (ii) are placed into contact with a solution containing triarylamines. Then the mixture is subjected to light exposition under condition providing self-assembly of the triarylamines into fibrillar organic supramolecular species. The fibrillar organic supramolecular species obtained are attached to the nanoparticles.

In one embodiment, step (iii) fibrillar organic supramolecular species are in a chlorinated solvent solution, such as for example chloroform, dichloromethane, tetrachloroethane and any mixture thereof.

Advantageously or preferably, the concentration of fibrillar organic supramolecular species in a solvent solution is of 0.1 mM to 100 mM, advantageously or preferably from 1 to 100 mM, for example from 1 to 20 mM, for example about 10 mM.

Advantageously or preferably, nanoparticles functionalized with thiol containing triarylamines are incubated in a solution of fibrillar organic supramolecular species. The incubation time is for example of 1 to 48 h, typically 24 h.

Advantageously or preferably, fibrillar organic supramolecular species including or consisting of an association of triarylamines are subjected to electromagnetic irradiation, for example light irradiation. Here, it may be referred to doped nanofibers or doped fibers.

For example light irradiation is performed by exposing the fibrillar organic supramolecular species including or consisting of an association of triarylamines to an halogen lamp, for example to a 10 or 20 W·cm$^{-2}$ halogen lamp.

In an advantageous or preferred embodiment, after step (iv) of interconnecting the functionalized metallic nanoparticles by fibrillar organic supramolecular species, the method includes a washing step, removing fibrillar organic supramolecular species that are not attached to nanoparticles.

In one aspect some embodiments relate to a hybrid organic-metal device including an optical conductor as defined in some embodiments.

In one aspect some embodiments relate to an optical device, in particular an optical circuit or solar energy conversion device including an optical conductor as defined in some embodiments.

In one aspect some embodiments relate to an optical circuit or solar energy conversion device including a substrate, optionally a layer of at least one amphiphilic polymer on the hydrophilic surface of which is located a layer of fibrillar organic supramolecular species including or consisting of an association of triarylamines advantageously forming a plasmonic layer, and optionally a dye containing layer.

In one embodiment, the optical device includes a substrate, optionally a layer of at least one amphiphilic polymer on the hydrophilic surface of which is located a layer, advantageously forming a plasmonic layer, of fibrillar organic supramolecular species including or consisting of an association of triarylamines interconnecting nanoparticles optionally in the form of nanoclusters of nanoparticles.

In one embodiment, the optical device includes a substrate, optionally a layer of at least one amphiphilic polymer on the hydrophilic surface of which is located a layer, advantageously forming a plasmonic layer, of crystallized fibrillar organic supramolecular species including or consisting of an association of triarylamines optionally on the surface of which is located a dye containing layer.

In one embodiment, the optical device is exposed to at least one electromagnetic radiation to provide an optical response. By optical response is meant for example that at least on electromagnetic radiation is generated by the optical device upon exposure to at least one incident electromagnetic radiation.

According to one embodiment, the incident electromagnetic radiation presents a fixed incident angle on the optical device.

According to one embodiment, the incident electromagnetic radiation presents a variable incident angle on the optical device.

According to one embodiment, the incident electromagnetic radiation presents multiple incident angles on the optical device.

According to one embodiment, the incident electromagnetic radiation is multi-directional relative to a surface of the optical device.

According to one embodiment, the incident electromagnetic radiation is mono-directional relative to a surface of the optical device.

According to one embodiment, the incident electromagnetic radiation (incident ray) is perpendicular to the surface of the optical device (the incident angle is zero).

According to one embodiment, the incident electromagnetic radiation (incident ray) is non-perpendicular to the surface of the optical device (the incident angle is not zero).

According to one embodiment, the optical response is dependent on the incident angle of the electromagnetic radiation.

According to one embodiment, the incident electromagnetic radiation is polarized.

According to one embodiment, the incident electromagnetic radiation is laser light.

According to one embodiment, the incident electromagnetic radiation is within visible light wavelength, typically from about 390 to 700 nm.

Some embodiments also relate to the use of one or more fibrillar organic supramolecular species including or consisting of an association of triarylamines, as defined in some embodiments, as optical waveguide(s).

Some embodiments also relate to the use of one or more fibrillar organic supramolecular species including or consisting of an association of triarylamines, as defined in some embodiments, as plasmonic waveguide(s).

Some embodiments also relate to irradiation by an electromagnetic radiation a device including one or more fibrillar organic supramolecular species including or consisting of an association of triarylamines, as defined in some embodiments, or a device containing such one or more fibrillar organic supramolecular species as defined in some embodiments.

The expression "as defined in some embodiments" or equivalents expressions relate to any variants, embodiments, optional, advantageous or preferred features and any of their combinations.

BRIEF DESCRIPTION OF THE FIGURES

In the figures:

FIG. 1 represents details of the plasmonic red shifts, depending on the surface treatment of the gold and on the doping of fibers.

FIG. 2 represents an overlay of the real optical conductivities, derived from ellipsometry measurements, depending on the surface treatment of gold nanoparticles and on the doping of fibers.

In FIGS. 1 and 2: A—naked gold nanoclusters; B—unfunctionalized with a monolayer of triarylamines and undoped fibers; C—functionalized with a monolayer of triarylamines and undoped fibers; D—unfunctionalized with a monolayer of triarylamines and doped fibers; E—functionalized with a monolayer of triarylamines and doped fibers; F—functionalized with a monolayer of triarylamines without fibers.

FIG. 3 represents the fit of the extinction spectrum for initial gold nanocluster. FIG. 4 represents a modelled LC circuit showing the parallel connection of isolated (B) and connected nanoparticles (R) in the array, with $I_i$ and $I_c$ representing the currents flowing in each of these loops, respectively. The $I_c$ loop is itself composed of an equal distribution (50/50) of nanoparticles connected in series and in parallel, depending on the angle of the connected nanoparticles with the incident light. FIG.

5 represents measured and predicted extinction spectra for attached nanoparticles and doped fibers.

Figure 6:
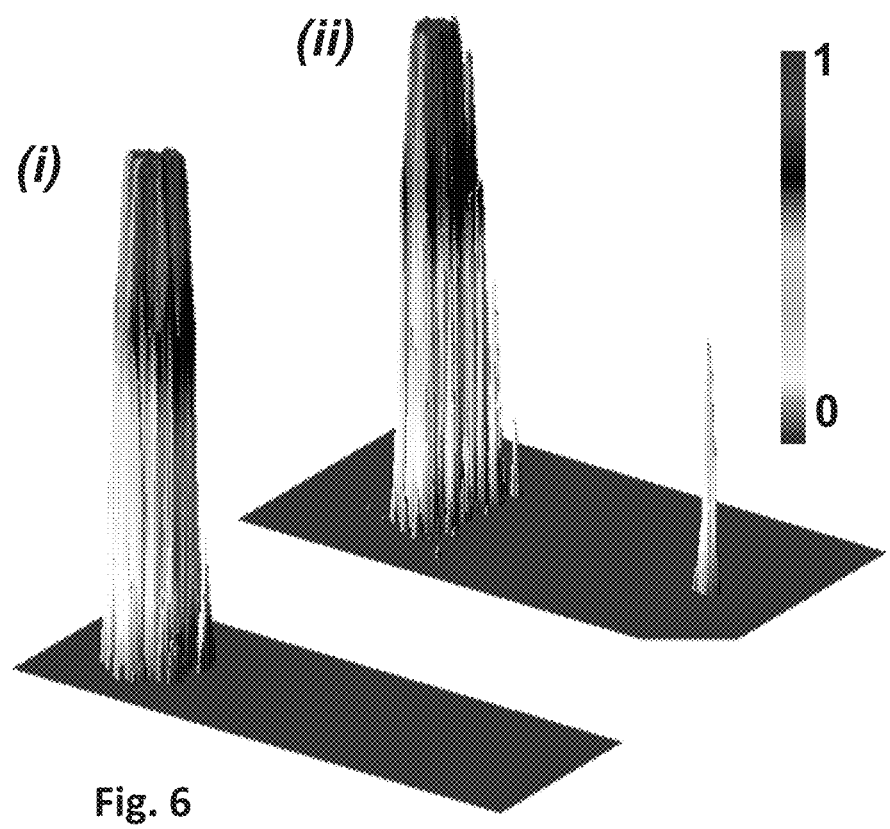

FIG. 6 represents images of light propagation in an oxidized crystal (as prepared according to example 1) covered with dye and absence of light propagation in an unoxidized crystal covered with dye (b, c; scale bars=3 μm, data taken from 8 crystals). Fluorescence measurement on an oxidized TSOF crystal with a 785 nm laser focused through a 100× objective with a confocal microscope.

EXAMPLES

Some embodiments will be illustrated according to the following examples. The following examples illustrate some embodiments without any limitation. Starting materials are known or commercially available, or may be prepared by known methods.

Example 1

Preparation of Crystals of Fibrillar Organic Supramolecular Species

1. Synthetic Procedure of Triarylamine Supramolecular Organic Framework (TSOF)

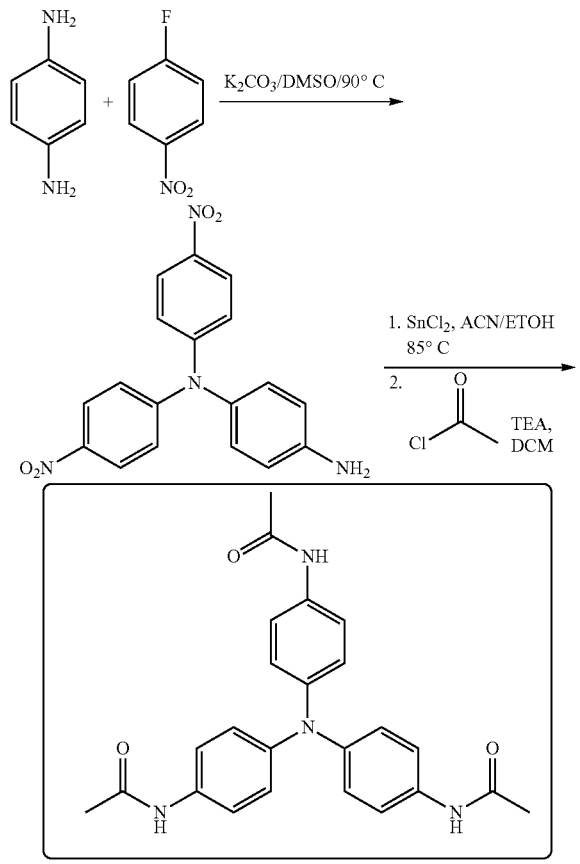

The acetyl substituted tris-amide triarylamines (AcTAT) above was synthesized according to previously reported general method[1] for TATA synthesis, giving a three-step yield of 62% (Armao, J. Jet al., *Journal of the American Chemical Society* 2014, 136, (32), 11382-11388).

[1] $^1$H (DMSO, 400 MHz, 293K) δ=9.95 (s, 3H), 7.46 (d, $^3$J=8.9 Hz, 6H), 6.87 (d, $^3$J=8.8 Hz, 6H), 2.01 (s, 9H)

$^{13}$C NMR (DMSO, 400 MHz, 295K) δ=167.8, 142.7, 134.2, 123.5, 120.3, 23.8

MS (ESI) calculated for $C_{24}H_{24}N_4O_3$: 416.18 (M$^+$); found: 416.38

The triarylamine supramolecular organic framework (TSOF) is formed from AcTAT described above. In order to control the crystallization of AcTAT, a solvent mixture of methanol (75%) and toluene (25%) was employed to ensure the absence of any self-assembly. NMR studies confirmed the presence of the monomer, unassembled species with this solvent mixture. Crystallization of TSOF was induced by slow evaporation, which favors the removal of the 'bad' solvent, methanol (b.p.=64.6° C.) while the 'good' solvent, toluene (b.p.=110.6° C.), increases in concentration thereby favoring self-assembly and ensuring thermodynamic control over the crystal structure packing. The triarylamine units are arranged in columns displaying an alternating AB type stacking (60° dihedral angle). Relevant intermolecular stacking distances include (1) a nitrogen-nitrogen distance of 4.173 Å as well as (2) a stacking distance of 3.608 Å from the ortho carbons. Due to the tilt of the aromatic rings, the aromatic hydrogen on the ortho carbon points towards the adjacent ortho carbon on the ring below giving a miniscule separation of 2.708 Å. The supramolecular organic framework is constructed via an intercolumnar hydrogen bonding network, with each amide group participating in two hydrogen bonds to adjacent triarylamines in a neighboring column on the plane above and the plane below. Additionally, the framework structure depicts cavities of 7.9 Å in diameter, and the crystal structure demonstrated the facile inclusion of methanol molecules within the cavities.

2. Crystal Structure of TSOF

X-ray quality crystals were obtained by first dissolving 75 mg of Acetyl-TAA in a mixture of 10.5 mL of MeOH and 3.4 mL of Toluene (75% MeOH/25% Toluene). This solvent mixture is efficient at breaking up the otherwise strong triple amide hydrogen bonding holding the assemblies together. Next, the solution was filtered through a 0.2 μm syringe filter to remove any large aggregates. The solution was then allowed to slowly evaporate in a fume hood. Rod-like crystals were formed after about a week of slow evaporation.

TABLE 1

| Crystal data for TATA-Ac | |
|---|---|
| Molecular Formula | $C_{24}H_{24}N_4O_3$ |
| Formula Weight | 480.55 |
| Temperature (K.) | 173 K. |
| Crystal System | Monoclinic |
| Space Group | $P2_1/c$ |
| Unit Cell dimensions | a = 8.4871 (3) |
| | b = 23.0849 (12) |
| | c = 13.0358 (6) |
| | α = 90° |
| | β = 93.552 (3)° |
| | γ = 90° |
| Volume (Å$^3$) | 2549.1 (2) |
| Z | 4 |
| Number of reflections | 5751 |
| R | 0.0778 |
| Goodness of Fit | 1.027 |

Crystal Structure displays incorporation of methanol molecules inside the cavities of TSOF.

TSFO present a AB stacking motif with a 60° dihedral angle between molecules.

3. Single Crystal Raman Measurements

Raman measurements on a single crystal of the TATA-Ac compound was performed.

NMR of resuspended crystals in chloroform demonstrated that TSOF remained intact as there was no signal apparent from isolated molecules. Irradiation with a 20 W halogen lamp induced the formation of stable radical cations inside the SOF. This is due to a well-known ability of triarylamines to be photooxidized in chlorinated solvents. Initially, irradiation gives rise to absorption bands around 800 nm, 650 nm, and 400 nm, typical of triarylamine radical cations. Interestingly, a large band appears around 470 nm which observed neither in the oxidized individual molecule, nor in the oxidized TATA nanowires. This is likely an intracolumnar charge transfer band due to electronic interactions between oxidized and neutral molecules inside the SOF. As the irradiation time is increased, there is a decrease in the band at 800 nm, typical of isolated triarylammonium radical cations, and a continued increase in the band at 470 nm. The TSOF crystals remained oxidized in solution for at least a week, demonstrating the stability of the radicals inside the framework structure. Thin films of the oxidized crystals displayed absorption bands at 0.8 eV, 2.1 eV, and 2.7 eV displaying the optical signature of delocalized polaron formation within TSOF. Similar polaron formation was observed with the TATA nanowires, though the transition energies between the bands are shifted down in energy due to the crystalline nature of the columns allowing for better structural ordering.

DFT calculations on a stack of 10 molecules with the coordinates taken from the crystal structure display the delocalization of the molecular orbitals due to tight packing of the aromatic cores. The electronic coupling between molecules along the stacking direction was determined to be 393.3 $cm^{-1}$ from DFT calculations on the crystal structure coordinates of a stacked dimer, using the energy splitting approach. Further investigations of the charge transport properties determined an electronic interaction of 618.95 meV (4992.17 $cm^{-1}$) between the HOMO and SOMO of neutral and charged species inside the SOF. This leads to an effective transfer integral of 63.36 meV (511.03 $cm^{-1}$), in line with typical values for high charge mobility TCNQ charge-transfer crystals. These results depict strong coupling between stacked molecules giving rise to large electronic couplings comparable with the most efficient synthetic and natural systems displaying long-range energy transport.

The effect of photodoping on the conductivity of TSOF was demonstrated by dropcasting the crystals over interdigitated electrodes with a 5 µm gap. Upon the application of 10 mV across the electrodes, the oxidized TSOF displayed high conductance, with a stable resistance around 500Ω. In contrast, the unoxidized TSOF displayed very low conductance, with a measured resistance above 100 MΩ. As, the applied voltage was varied between 10 mV and 5V, oxidized TSOF displayed linear behavior throughout the entire voltage window. Unoxidized TSOF displayed three distinct regimes indicating charge-trap limited behavior. Additionally, oxidized TSOF displayed linear Ohmic behavior when sweeping the voltage potential between −1 V and +1 V.

Birefringence was observed with TSOF crystals under crossed polarizers, demonstrating a net orientation of the molecules in the crystal along the long axis of the crystal—i.e. the stacking direction is indeed parallel to the long axis of the crystal. Physically, this means that there is a non-zero difference in the two refractive index planes of the crystal, the parallel and perpendicular planes which leads to a net rotation of incident plane polarized light. The TSOF crystals were tested for their ability to act as photonic waveguides using a confocal microscope with the incident laser (532 nm or 785 nm) focused through a 100× objective. The crystals were prepared on glass slides from the appropriate suspensions. Non-oxidized TSOF crystals were dropcast from a suspension of 1 mg of AcTAT in 750 uL MeOH and 250 uL toluene. Oxidized TSOF was prepared by irradiating for 1 hr. with a halogen lamp (1 mg in 500 uL $CHCl_3$ and 80 uL MeOH).

The lengths of the crystals varied between 4 µm and 40 µm with an average width between 1 um and 3 um. Upon focusing the laser at the tip of the crystals, we could observe output at the distal end with both the 532 nm and 785 nm lasers. Optical waveguiding was observed in over 90% of the TSOF crystals regardless of whether they were oxidized or not. No waveguiding was observed when the laser was focused on top of the crystal away from the ends. Multiple waveguiding outputs were routinely observed with crystals displaying defects. We are able to rule out the photoluminescent mechanism, which is responsible for almost all reported active organic waveguides, for three reasons: (1) the incident laser source is in a region where the unoxidized crystal does not absorb (532 nm and 785 nm), (2) we do not observe any fluorescence when directly irradiating both the oxidized and unoxidized crystals with both laser sources, and (3) we do not observe waveguiding behavior unless the SOF is illuminated at the tip.

To further elucidate the waveguding behavior, fluorescence bleaching experiments were performed on the oxidized TSOF crystals. These experiments were performed in a similar manner as the Bleach-Imaged Plasmon Propagation technique used to identify plasmon propagation in metallic waveguides. Oxidized and unoxidized crystals were both tested by irradiating with a laser for 10 minutes at 20 W at a distance of 5 cm from the sample and then recording the fluorescence signal at various points on the crystal. Upon spin coating indocyanine dye on top of the crystals, we no longer observed the waveguiding phenomenon with the unoxidized crystals, but continued to observe it with the oxidized ones.

We observed a clear increase in the dye bleaching distance along the crystal for the oxidized crystal in comparison with the unoxidized crystals. The unoxidized crystals essentially correct for any effect of scattering along the surface of the crystals. They displayed a similar propagation distance as a dye control on glass substrate. This demonstrates the efficient energy transfer over 4 microns with the oxidized TSOF when coupled with incident light at the crystal tip. This clearly displays the ability of the TSOF to couple with the incident light and transfer the energy over micron length distances. This strongly suggests that coupling of the incident laser light with the free metallic electrons within the crystals, akin to what is commonly observed in metallic nanowires, is giving rise to the waveguiding effect observed with the oxidized crystals.

For the unoxidized TSOF, the observations match a passive waveguiding mechanism. Upon addition of the dye, quenching of the passive waveguiding mechanism occurs for two reasons: (1) the increase in the dielectric constant of the environment resulting in a similar dielectric as the organic crystal (1.5-2), passive waveguiding is dependent upon the refractive index of the material being larger than the refractive index of the surroundings to take advantage of total internal reflection at the interface, and (2) the surface is covered with a molecule which highly absorbs at the wavelength of energy being propagated, this should lead to large losses and retarded waveguiding propagation lengths.

On the other hand, the oxidized TSOF displays an active waveguiding mechanism as highlighted by the continued waveguiding output with the dye on top of the crystal. The BLIPP experiments clearly efficient energy transport mechanism due to the coherent polaronic band structure introduced in the crystal upon doping. Additionally, the photobleaching effect ends before the end of the crystal even though we still observe light output at the distal end. This indicates the existence of multi-modal waveguiding, where higher modes decay rapidly away from the excitation point leaving the lower modes to propagate through the columns. We have observed the effect on crystals as narrow as 750 nm (see S.I.) thereby ruling out the possibility of multimodal passive waveguiding.

These results demonstrate the formation of supramolecular organic frameworks displaying dual waveguiding mechanisms. The first mechanism is due to passive waveguiding at the interface between the crystal and air. The second waveguiding mechanism is plasmonic in nature, due to coupling between the incident light and the delocalized metallic electrons within the structures.

Example 2

Nanofibers Interconnecting Nanoparticles

The plasmonic devices for the present study were fully self-assembled by a hierarchical three-step strategy involving: i) the formation of an array of gold nanoclusters on an insulating surface; ii) the functionalization of these nanoclusters with a monolayer of tris-thiol triarylamine 2; and iii) the directed crosslink of these functionalized nanoclusters by STANWs made of 1 (STANWs=Supramolecular Triarylamine NanoWires).

1. Synthesis of Triarylamine Molecules 1 and 2

General Methods

All reagents and solvents were purchased at the highest commercial quality (Sigma Aldrich, Acros, TCI) and used without further purification unless otherwise noted. Dry solvents were used from a double column SolvTech purification system. Water was deionized by using a milli-gradient system (Millipore, Molsheim, France). All reactions were carried out under argon atmosphere with dry solvents unless otherwise noted.

Chloroform was filtered over basic alumina before use in all of the experiments. $^1$H NMR spectra were recorded on a Bruker Avance 400 spectrometer at 400 MHz and the $^{13}$C NMR spectra at 100 MHz. For $^1$H and $^{13}$C NMR assignments, the chemical shifts (δ) are given in ppm. Coupling constants J are given in Hz. Peaks are described as singlet (s), doublet (d), triplet (t), quadruplet (q), multiplet (m) and broad (br.). Ultra Performance Liquid Chromatography coupled to Mass Spectroscopy (UPLC-MS) was carried out on a *Waters Acquity UPLC-SQD* apparatus equipped with a PDA detector (190-500 nm, 80 Hz), using a reverse phase column (Waters, BEH C$_{18}$ 1.7 μm, 2.1×50 mm), the MassLynx 4.1-XP software and a gradient (water-acetonitrile+0.1% TFA) as eluent. Electrospray-ionization mass spectrometry (ESI-MS) was recorded with a Waters SQ Detector, single quadruple mass spectrometer.

Synthetic Procedure for 1

Molecule 1 was synthesized using a protocol previously described in the literature.[24]

Synthetic Procedure for 2

Scheme 1. Synthetic route to tris-thiol triarylamine 2.

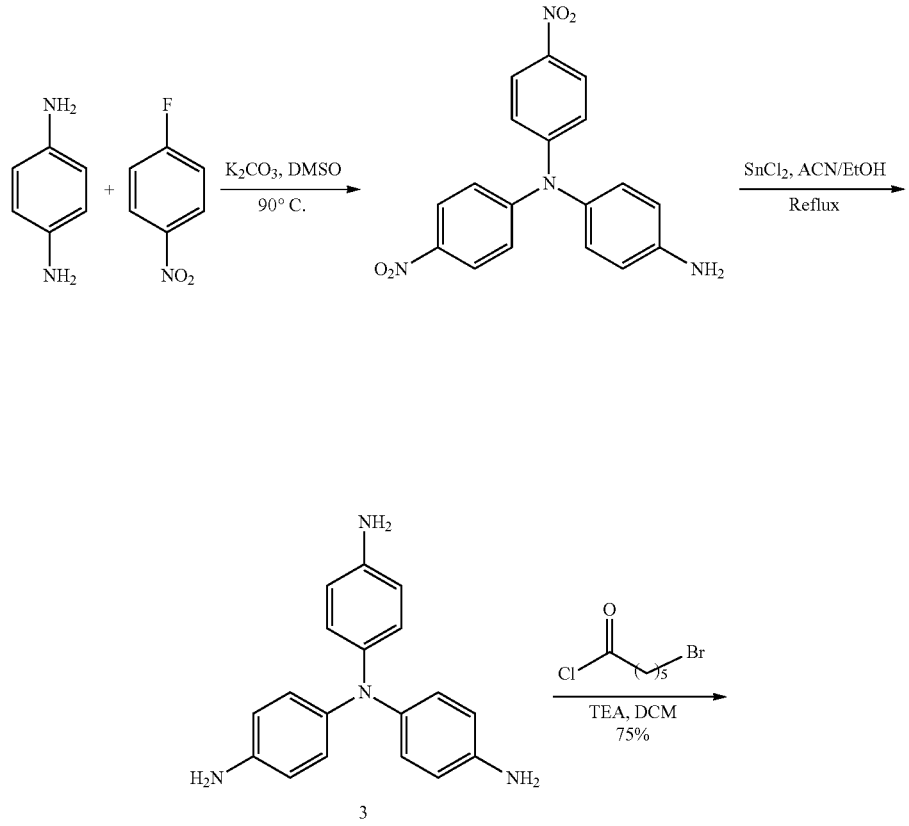

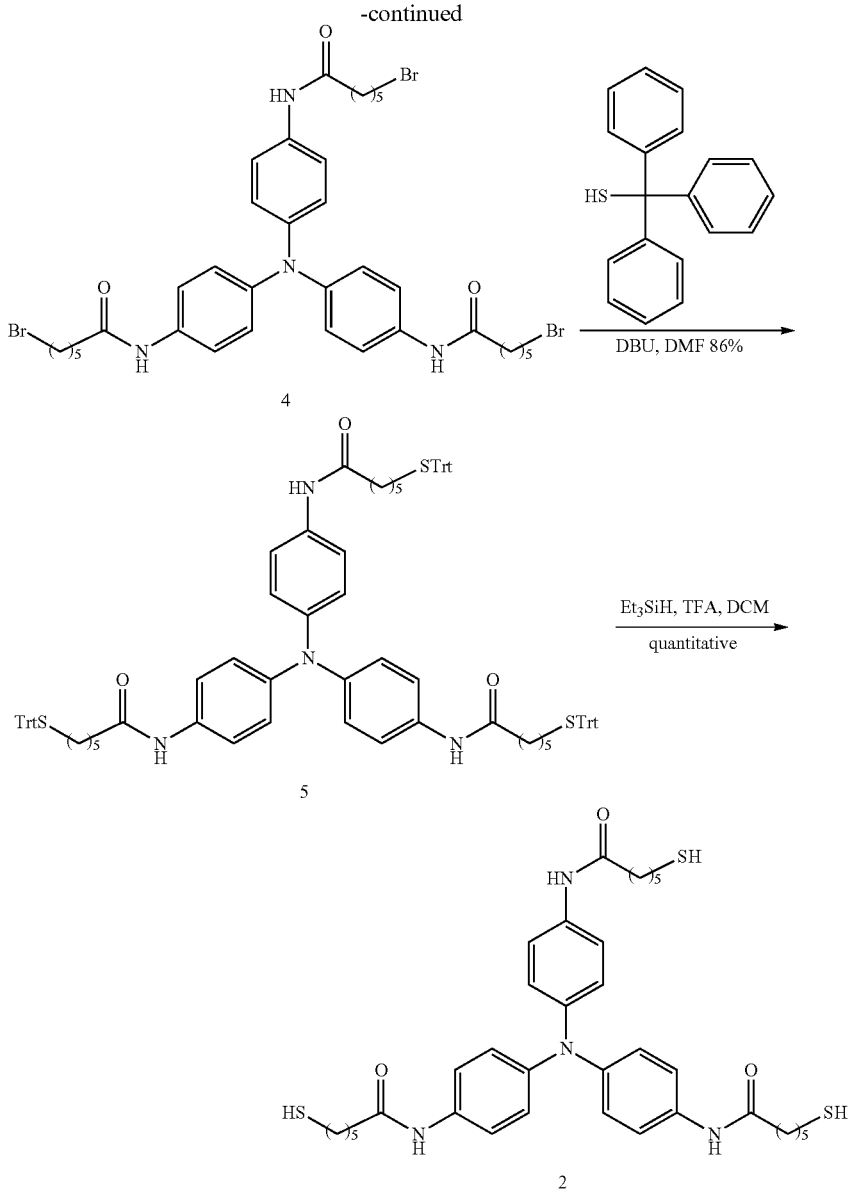

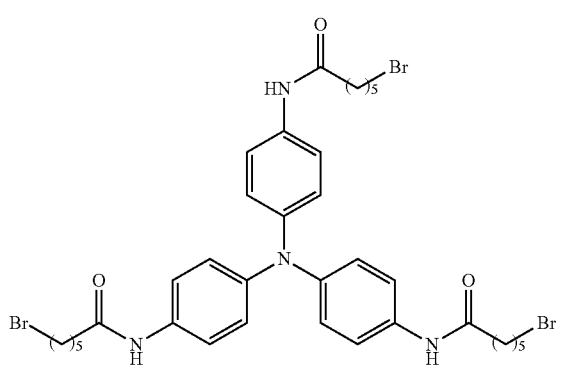

Tris-amine precursor 4 was prepared according to previously reported literature procedures.[1] Compound 3 (400 mg, 1.4 mmol) was dissolved in dichloromethane (60 mL) along with triethylamine (0.763 mL, 5.5 mmol). The solution was placed in an ice bath and 6-bromohexanoyl chloride (0.841 mL, 5.5 mmol) was added dropwise. After the addition, the ice bath was removed and the reaction allowed proceeding overnight at room temperature. The next day, the reaction was diluted with ether (600 mL), washed with 1M HCl (2×120 mL), brine (2×120 mL) and then dried down. The resulting powder was further washed with copious amounts of water to remove residual triethylamine before being dried to give pure compound 2 as an off-white powder (860 mg, 75% yield).

$^1$H NMR (MeOD, 400 MHz, 300K) δ=7.38 (d, $^3J$=8.9 Hz, 6H), 6.92 (d, $^3J$=8.9 Hz, 6H), 3.42 (t, $^3J$=6.8 Hz, 6H), 2.33 (t, $^3J$=7.5 Hz, 6H), 1.89-1.79 (m, 6H), 1.70-1.64 (m, 6H), 1.52-1.42 (m, 6H)

$^{13}$C NMR (MeOD, 100 MHz, 300K) δ=172.7, 144.0, 133.3, 123.7, 121.2, 36.2, 32.6, 32.2, 27.3, 24.6

MS (ESI) calculated for $C_{36}H_{45}Br_3N_4O$: 820.10 [M]$^+$ found 820.16

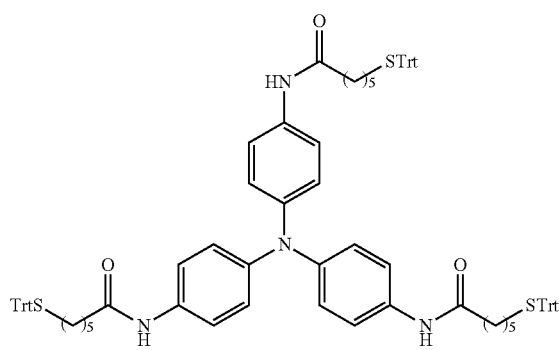

Triarylamine intermediate 4 (500 mg, 0.61 mmol) was dissolved in DMF (40 mL) along with DBU (0.359 mL, 2.4 mmol). Triphenylmethanethiol (672 mg, 2.4 mmol, 4 equiv.) was added to the flask and the reaction was heated to 35° C. and allowed to react overnight. The next day, the reaction mixture was dissolved in ethyl acetate (400 mL), washed with water (3×120 mL), with brine (1×120 mL), dried over sodium sulfate and the solvent evaporated under vacuum. The product was loaded on a silica column and washed with cyclohexane and ethyl acetate. The product was retrieved from the top of the column, dissolved in a mixture of methanol and toluene and the solution filtered, providing compound 5 as a white powder (731 mg, 86% yield).

$^1$H NMR (5:3 MeOD: Toluene-$d_8$, 400 MHz, 300K) δ=7.59 (d, $^3J$=8.7 Hz, 6H), 7.51 (d, $^3J$=7.5 Hz, 18H), 7.16-7.06 (m, overlap with toluene), 7.04 (d, $^3J$=8.9 Hz, 6H), 2.27-2.20 (m, 12H), 1.57-1.48 (m, 6H), 1.46-1.38 (m, 6H), 1.36-1.30 (m, 6H)

$^{13}$C NMR (5:3 MeOD:Toluene-$d_8$, 100 MHz, 300K) δ=173.5, 146.3, 145.1, 134.7, 130.6, 128.6, 127.4, 125.0, 122.2, 67.5, 37.6, 32.7, 29.5 (m), 26.3

MS (ESI) calculated for $C_{93}H_{90}N_4O_3S_3$: 1408.62 [M+H]$^+$, found 1408.47

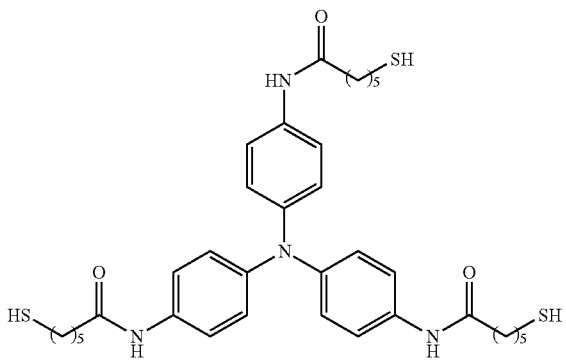

Deprotection of trityl intermediate 5 was performed on a small scale the same day as monolayer formation in order to avoid unwanted oxidation of the thiol groups. It is critical to perform the purification under an inert atmosphere to avoid oxidation of the free thiols. First, compound 3 (5 to 20 mg) was placed inside a round bottom flask under Argon in dichloromethane (5 mL, filtered over basic alumina) along with triethylsilane (0.5 mL) and trifluoroacetic acid (1 mL). The solution was stirred for 1 hr. at room temperature, and the contents protected from light. The solvent was then removed under vacuum and the flask backfilled with argon. The contents were then dissolved in a 3:1 mixture of cyclohexane:ethyl acetate (5 mL) and the solution loaded on top of a silica column. After washing the column with at least 2 column volumes (min. 10 mL), the product was retrieved from the top of the column and dried. It was then dissolved in methanol (5 mL) and run through a column filled with neutral alumina. For each deprotection, the purity of the product was checked by LC/MS and $^1$H NMR. A molar absorptivity coefficient of 1940 M$^{-1}$ cm$^{-1}$ was determined for the absorption maximum at 322 nm and was used to adjust the concentrations for the subsequent monolayer deposition procedure.

$^1$H NMR (MeOD, 400 MHz, 300K) δ=7.42 (d, $^3J$=8.9 Hz, 6H), 6.96 (d, $^3J$=8.9 Hz, 6H), 2.52 (t, $^3J$=7.2 Hz, 6H), 2.37 (t, $^3J$=7.1 Hz, 6H), 1.68-1.62 (m, 12H), 1.52-1.42 (m, 6H)

MS (ESI): calculated for $C_{36}H_{48}N_4O_3S_3$: 680.29 [M]$^+$, found 680.49

2. Gold Nanoclusters Array Characterization

First, the array of nanoparticles was obtained using a templating strategy involving block copolymers. A solution of self-assembled reverse micelles of polystyrene-poly-2-vinylpyridine (PS-P2VP) was spin coated onto either glass or non-conducting silicon substrates to pattern an hexagonal mesostructure. Then, 13 nm gold nanoparticles were selectively adsorbed onto the hydrophilic polymer domains, producing clusters of gold nanoparticles. Subsequent oxygen plasma treatment removed the exposed hydrophobic polymer from the surface, leaving isolated gold nanoclusters with an average height of 48.9±4.3 nm, and an edge-to-edge distance of 94.5±15.5 nm between nearest neighbors, as determined by atomic force microscopy (AFM) and scanning electron microscopy (SEM). Gold nanoclusters array obtained from a PS-P2VP template surface were characterized by AFM height imaging. Height profile obtained. Magnification enables to locate clusters containing on average 10 nanoparticles. SEM images at different magnifications were used to determine the average distance between gold nanoclusters (94.5 nm±15.5 nm (n=114)). Height of the substrate as determined by ellipsometry at different stages in the process: PS-P2VP layer, after addition of gold nanoparticles, and after plasma treatment of the surface.

3. Thiol Monolayer Formation

Second, a monolayer of tris-thiol triarylamine 2 was formed on the gold surface of the nanoparticles. To avoid self-aggregation of 2 at this stage, we worked in methanol solutions to preclude the formation of stabilizing intermolecular hydrogen bonds. Moreover, the critical aspect of this step was to achieve the desired parallel orientation (versus the undesired perpendicular one) of the triarylamine core with the nanoparticle surface. This was optimized by using a quartz crystal microbalance (QCM) to study the effect of concentration on the layer topology. Marked differences were measured between high concentration (1 mM) and low concentration solutions (10 μM), with corresponding mass loadings of 2.34 molecule·nm$^{-2}$ and 0.55 molecule·nm$^{-2}$, respectively. From density functional theory (DFT) calculations, we determined a maximum loading for the parallel-oriented monolayer of 0.71 molecules nm$^{-2}$, while the densely packed perpendicular orientation gave 2.48 molecules nm$^{-2}$.

Formation of the triarylamine monolayer was investigated using quartz crystal microbalance with dissipation (QCM-D) and atomic force microscopy (AFM). The advantages of this technique are that they allow the real time monitoring of the rate of deposition as well as the mass of deposited material. A negligible dissipation signal was observed during the deposition experiments, indicating the formation of a rigid monolayer and allowing the amount of material deposited on the surface to be estimated from the Sauerbrey equation. Monolayers formed from low concentration (10 µM) and high concentration (1 mM) solutions of 2 resulted in mass densities of 0.55 molecules $nm^{-2}$ and 2.34 molecules $nm^{-2}$, respectively. Subsequent deposition from a 1 mM solution onto the monolayer prepared from the 10 µM solution gave an additional mass loading of 0.939 molecules $nm^{-2}$. The combined mass from this sequential deposition was 1.489 molecules $nm^{-2}$, demonstrating a difference of 0.851 molecules $nm^{-2}$ with the high concentration deposition on a clean substrate. These data are indicative of a significant change in the monolayer packing depending upon the concentration of the depositing solution. From DFT calculations, the core of a triarylamine molecule oriented parallel to the surface will take up approximately 1.4 $nm^2$, giving a maximum concentration of 0.71 molecules $nm^{-2}$. In contrast, perpendicular orientation to the surface will take up an area of 0.4 $nm^2$, giving a maximum concentration of 2.48 molecules $nm^{-2}$. Overall, the low concentration solution is consistent with a parallel orientation of the triarylamines with all three thiol groups anchoring to the surface, while the high concentration deposition is consistent with a perpendicular orientation with either one or two of the thiol groups bonded to the surface.

Analysis of the deposition kinetics also demonstrated a marked difference between the two deposition concentrations. The monolayer formed from a high concentration solution of the thiol was modeled using a diffusion-limited Langmuir model:

$$\theta(t) = [1 - e^{-kt^{0.5}}]$$

giving a rate constant of 0.255 $s^{-1/2}$. This indicates that the adsorption kinetics are influenced by the fraction of available surface area on the gold substrate indicative of molecular crowding at the surface. By contrast, the 10 uM concentration fit includes two regimes, an initial linear regime due to the mass transport of the thiol molecules along a concentration gradient from the bulk solution to the surface followed by a diffusion-controlled regime. The linear fit resulted in a rate constant of 0.0006875 $s^{-1}$. After the surface functionalization had reached 40% of the final coverage, the deposition kinetics transitioned to a diffusion-controlled regime:

$$\theta(t) = k_d \sqrt{t}$$

with a rate constant of 0.0165 $s^{-1/2}$. Thus, deposition affected from a low concentration solution does not incur the kinetic limitation observed from high concentration solutions. The results indicate that the concentration of the depositing solution influences the kinetics of the deposition process which in turn gives rise to two predominant orientations on the surface: (1) the thermodynamically favored parallel orientation with all three thiol groups attached to the surface, and (2) the perpendicular orientation which is kinetically controlled due to rapid deposition from high concentration solutions. The relatively strong (ca. 50 kcal·$mol^{-1}$) gold-thiol bonds are able to trap the kinetically controlled perpendicular orientation, while providing the energetics to make the parallel orientation thermodynamically favorable.

4. STANWs Self-Assembly Between Nanoclusters

This step involves the attachment and connection of the nanoclusters via supramolecular recognition from the nanowires. The best conditions for the attachment involved high concentrations (1 mM) for extended periods of time (24 hours). Chloroform was used as the deposition solvent since the assembly of these wires has been predominately characterized with this solvent. Control experiments highlighted the necessity of this hierarchical process in order to achieve the desired outcome. A substrate incubated with a 1 mM chloroform solution of fibers 1 for 24 hours displayed no fibers remaining after washing. A second control experiment involving pre-functionalization with a high concentration of molecule 2 in chloroform displayed amorphous deposition of the molecules that were resistant to washing. Additionally, high concentrations of 2 in methanol (1 mM) led to displacement and aggregation of the nanoclusters without any wire attachment, as reported by AFM using peak force error image. In chloroform, the fibers can be oxidized by simple light irradiation with a 10 W·$cm^{-2}$ halogen lamp, leading to conducting organic metals.[24] In the following, the terms of "undoped" (or "doped") wires will refer to the absence (or the presence) of such light irradiation applied during the first 10 min of the incubation process.

Various techniques were used to probe the STANWs—nanoclusters connections. For instance, AFM images immediately after incubation display a network of nanoparticles and dense fibers. From AFM results (not shown here) and on average, one can determine a ratio of fibers over clusters is of 1.25, which means on average 12.5% of connected fibers per nanoparticle, as clusters contain on average 10 nanoparticles.

Upon washing the substrates with chloroform, only fibers strongly connected to nearby nanoparticles remained. As a control experiment, nanoclusters not subjected to the thiol functionalization step did not display any remaining wires after washing. Surface Enhanced Raman Scattering (SERS) was also used as an ultrasensitive method for probing the local chemical environment at the gold surface. Raman signals display a clear signature for the monolayer of 2, demonstrating effective functionalization of the nanoclusters. Notably, there is no observable Raman signal for the substrate covered by STANWs without surface pre-functionalization with 2, demonstrating their inefficient attachment to naked nanoclusters. However, functionalized nanoclusters with doped nanowires display an enhancement of Raman modes at 1175 $cm^{-1}$ and 1600 $cm^{-1}$, together with a suppression of other modes, thus showing an effective connection through the monolayer.

Optical Measurements

The doped, unattached substrate and the doped attached substrates gave standard deviations of 1.29% and 3.79%, respectively, from the raw ellipsometry data (n=5). The dielectric constant of the plasmonic layer is composed of a real and imaginary part. In general, the real part indicates the strength of polarization induced by an applied electromagnetic (EM) field, while the imaginary part indicates the losses incurred when polarizing the material. Here, the imaginary dielectric constant corresponds to the absorptive effect of inducing plasmonic oscillations within the nanoparticles. The imaginary part of the dielectric constant can also be used to determine the real part of the optical conductivity from the following relation:

$$\sigma_r = \frac{\varepsilon_i \omega}{4\pi}$$

Since the conduction electrons in the gold are bound spatially, they will exhibit Lorentzian behavior in response to the driving electromagnetic field. Thus, the real part of the optical conductivity corresponds to the induced current in phase with the driving EM field. The description of Lorentzian oscillators depicts three key variables. First, the resonant frequency is $\omega_o$ which determines the oscillator position. In Lorentzian theory, this is proportional to the force constant on the system which is the electric field vector experienced by the conduction electrons in the nanoparticles. Contributions from local fields, i.e. electric fields emanating from nearby electron oscillations can disrupt the incident EM field, thus altering the restoring force of the oscillator and shifting the plasmonic resonance frequency. Next, the oscillator strength, f, is a sum rule of the number of electronic interactions and directly relates the number of electrons undergoing oscillations. The damping parameter will depend on the size of the nanoparticles and can also be due to interactions of the plasmonic oscillations with molecules near the nanoparticle surface.

Upon oxidative doping, and although fully organic, supramolecular triarylamine nanowires (STANWs) composed by stacks of molecule 1 display metallic electrons in a through-space half-filled polaronic conduction band structure, with a plasma frequency of 1.16 eV. These helical fibers have a roughness of 4 Å over a length of 100 nm[24] and exhibit a coaxial topology where their core (≈1 nm in diameter) contains a metallic conduction band presenting negative values for the real part of its dielectric constant, and which is surrounded by a positive dielectric layer made of lateral alkyl chains.

Plasmonic Properties
AS Previously Described:
Preparation of Plasmonic Substrates 50 μL of polystyrene-poly-2-vinylpyridine (PS-P2VP; 5 mg/mL in o-xylene) was spin-coated onto either glass or silicon substrates at 4000 RPM. The substrates were then placed inside a closed 500 mL container suspended above 10 mL of o-xylene for 24 hours, with the temperature maintained at 23° C. Next, the substrate s were incubated in a solution of 13 nm gold nanoparticles (synthesized from a 1 mM HAuCl$_4$ solution)[36] for 2.5 hours. The substrates were then rinsed twice with milli-Q water (5 minutes incubations). This was followed by oxygen plasma treatment for 20 minutes. The cleaned substrates were then incubated in a 10 μM MeOH solution of 2 for 1 hour under argon. Afterwards, the solution was removed and the substrates rinsed with methanol twice (5 minutes incubations) before being dried under a stream of argon. The connected nanoclusters were prepared by incubating the substrates for 24 hours in a 1 mM chloroform solution of 1 under argon. Doped fibers of 1 were prepared by irradiating the chloroform solution for 10 minutes with a 20 W halogen lamp placed 5 cm from the sample vial. Undoped substrates were protected from light throughout the incubation process. The solution was removed by tilting the glass vial containing the substrates at a 30° angle and pipetting off the chloroform. Washing was performed by incubating the substrates for 5 minutes in fresh chloroform solution.

The various plasmonic responses of these substrates were studied in their interconnected versus disconnected configurations. Far-field scattering spectrum of the reference array of nanoparticles covered only by a monolayer of 2 exhibited a plasmonic peak at 651±4.5 nm, similar to the naked nanoparticles 647±2.8 nm. Substrates prepared with undoped fibers displayed equivalent red-shifts, regardless the pre-functionalization of the nanoclusters (14.7±2.9 nm unattached; 14.3±3.8 nm attached). An increase in the red-shift of 23.4±5.9 nm was observed with doped fibers on unfunctionalized substrates and, finally, functionalized nanoclusters connected by doped nanowires displayed the largest red-shifts (49.3±2.5 nm).

The optical constants of the plasmonic layer were determined from spectroscopic ellipsometry measurements by fitting the data with a three-phase model including or consisting of air, the plasmonic layer, and the silicon substrate. The thickness of the plasmonic layer was set to 49 nm, the average height determined by AFM measurements, while the air and silicon layer were set to their known optical values. Then the plasmonic layer was fit by a Drude-Lorentz function with three Lorentzian oscillators:

$$\varepsilon(\omega) = \varepsilon_\infty + \sum_{j=1}^{3} \frac{f_f \omega_{0f}^2}{\omega_{0j}^2 - \omega^2 + i\gamma_j \omega}$$

where $\omega_0$ is the resonance frequency, $\gamma$ is the damping parameter, and f is the fractional strength of the $j^{th}$ oscillator. The real part of the dielectric constant indicates the strength of polarization induced by an applied electromagnetic field while the imaginary part indicates the losses (due to absorption processes) incurred when polarizing the material. The imaginary part of the spectrum exhibits a peak at the resonant frequency corresponding to the strong absorption regime of the nanoparticles. Meanwhile, the real part exhibits a region of low polarization at wavelengths below the resonant frequency and a region of high polarization at wavelengths above the resonant frequency. There are two clear effects of nanofiber doping apparent from the values: (1) a red-shift in the resonant frequency and (2) an increase in the dielectric values.

Since the substrates are homogenous in terms of their material content, including or consisting of nanoclusters and nanofibers, the origin of the change in the dielectric constants must or should come from a change in the electronic processes within the plasmonic layer. Plasmonic resonances in nanoparticles may be damped either radiatively, with the simultaneous emission of a photon into the far-field, or non-radiatively by Landau damping, resulting in the creation of hot electron-hole pairs. The imaginary part of the dielectric constant at visible wavelengths is determined by the extent of Landau damping. Therefore, it may be used to evaluate the contribution of Landau damping to the decay pathway. For metallic nanoparticles larger than 10 nm, radiative damping is normally the predominant decay pathway. However, it is clear from the data that the effect of doping the nanofibers leads to a large increase in the dielectric constant, indicating a change in the decay pathway in favor of non-radiative processes. It was observed a Fermi level ($E_F$) of gold at −5.1 eV along with the creation of hot electrons with energies up to −3.2 eV ($E_F+\bar{n}\omega_{LSPR}$ for $\omega_{LSPR}=650$ nm). Upon connecting the doped nanowires (STANWS•+), we observe that the energy diagram allows for the excited electron to transfer into the oxidized nanofibers' half-filled polaronic band (HFPB), while the electron from the HFPB can quench the hole in the metal. This is effectively a transfer of metallic electrons from the nanoparticle into the wire, which may then be efficiently propagated to the opposing nanoparticle, thereby forming a plasmonic connection. The importance of the first layer of triarylamine 2 at the nanoparticle surface can be understood by such a process.

To further examine this mechanism, the imaginary part of the dielectric constant was used to derive the optical conductivity ($s_r$) of the plasmonic layer. The data display a massive increase of $s_r$ going from 259 $\Omega^{-1} \cdot cm^{-1}$ for the undoped nanowires, to 3193 $\Omega^{-1} \cdot cm^{-1}$ for the doped unattached nanowires. This demonstrates a significant coupling of the metallic electrons in the STANWs to the plasmonic oscillations of the gold nanoclusters, which are in turn coupled to the incident electromagnetic field. Pre-functionalization of gold with the thiol monolayer gave an additional 34% increase in the oscillator strength (4271 $\Omega^{-1} \cdot cm^{-1}$), emphasizing the benefit of supramolecular attachment of the doped wires at gold surface to increase the efficiency of the coupling. Comparatively, optical conductivity values taken from the literature for 9 nm continuous gold films are in the range of 3000 $\Omega^{-1} \cdot cm^{-1}$ at a wavelength of 650 nm. These conclusions correlate well with Lorentz theory, which directly relates the magnitude of the optical conductivity (oscillator strength) to the number of electrons undergoing oscillations in the plasmonic layer. Convergently, a significant red-shift of the resonance frequency of the oscillator ($\omega$) was observed with the peak position going from 548 nm for the undoped nanowires, to 623 nm and 633 nm for the doped unattached and doped attached nanowires, respectively. These peak values do not correspond to the red-shifts observed with the extinction measurements for two reasons: (1) the extinction spectrum contains a scattering component, which is likely to be quite significant due to the nanocluster morphology, and (2) the optical conductivity is derived from the imaginary part of the dielectric constant of the material, but ignores the contribution from the real part, which contributes to the materials refractive index. Moreover, the damping parameter ($\gamma$), which is related to interactions at the particle surface, was equivalent for the doped and undoped nanowires with the unfunctionalized substrates (100 nm), but was found to increase to 109 nm for the thiol-functionalized substrate, demonstrating again an increased coupling of the oscillations at the interface. The dissipation factor was determined by taking the ratio between the imaginary and real parts of the dielectric constants. This dimensionless quantity depicts the amount of energy supplied by an external EM field that is dissipated in the system through non-radiative mechanisms. We measured a 10-fold increase between the doped and non-doped substrates. Additionally, attachment to thiol-functionalized clusters resulted in a further 3-fold increase in the dissipation factor. These results further support the hot electron transfer mechanism with the nanowires.

Finally, the far-field scattering spectra were fit using optical nanocircuit theory. Optical nanocircuits rely on displacement currents and not on conduction currents that are the basis of conventional electrical circuits. These displacement currents respond to changes in the near-field environment, which then couple to electromagnetic fields allowing detection by far-field methods. At plasmonic resonance, the incident EM field induces a current inside the NP due to the oscillation of electrons. This oscillation of electrons in time creates an alternating voltage potential applied to either end of the nanoparticle which then induces a current, I, as the electrons respond to the potential change. In order to completely describe the optical response of an isolated nanoparticle, two impedance elements need to be added to the circuit. First is an inductance element, $Z_I$, due to the negative dielectric constant of gold, and second is a capacitance element, $Z_C$, due to the interaction of the induced near-field with the surrounding environment:

$$Z_I = (-i\omega \pi R \varepsilon_r)^{-1}$$

$$Z_C = (-i\omega 2\pi R \varepsilon_s)^{-1}$$

where $\omega$ is the frequency, $\varepsilon_s$ is the permittivity of the region surrounding the nanoparticle, $\varepsilon_r$ is the real part of the dielectric constant of gold and R is the radius of the nanoparticle.

Figure 1:
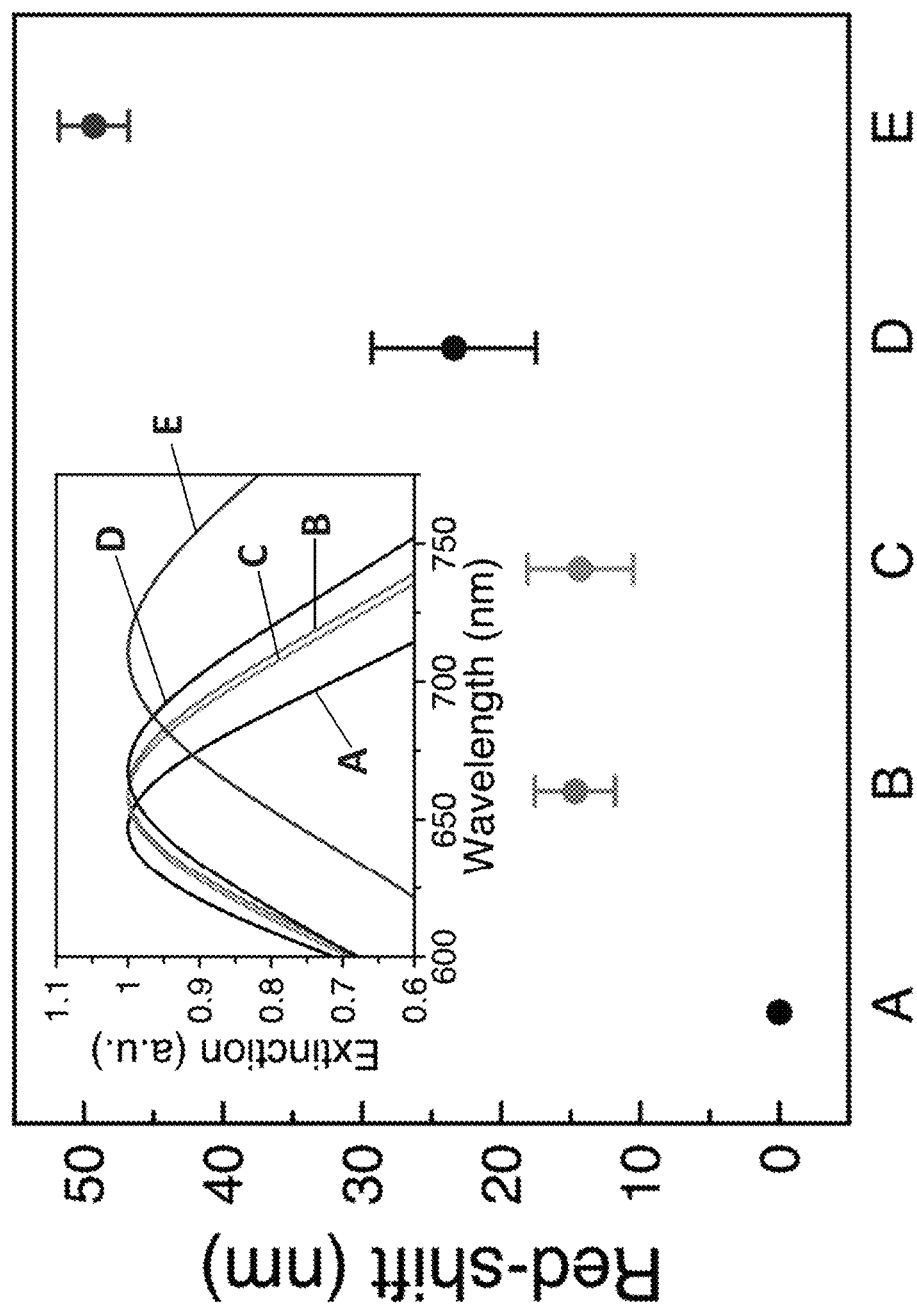
FIGS. 1 and 2 represent optical properties of unconnected and connected plasmonic arrays obtained with nanofibers prepared according to example 2.
Figure 2:
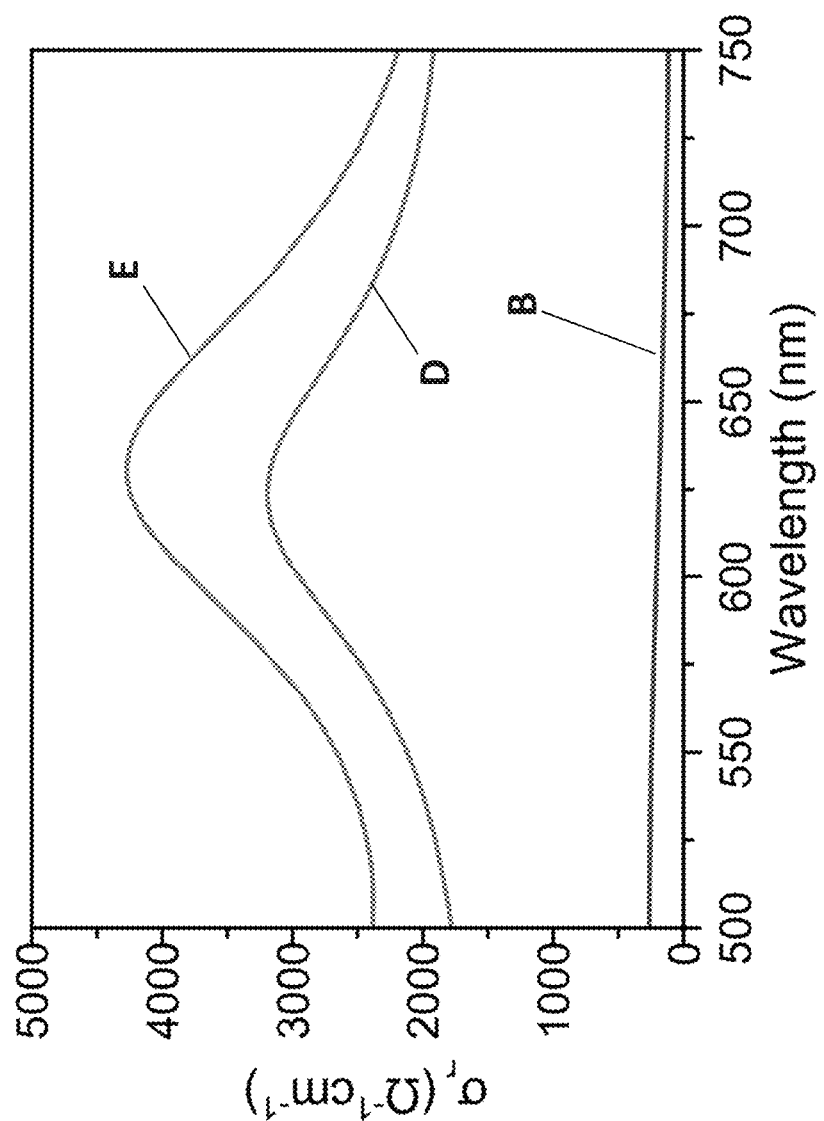
Figure 3:
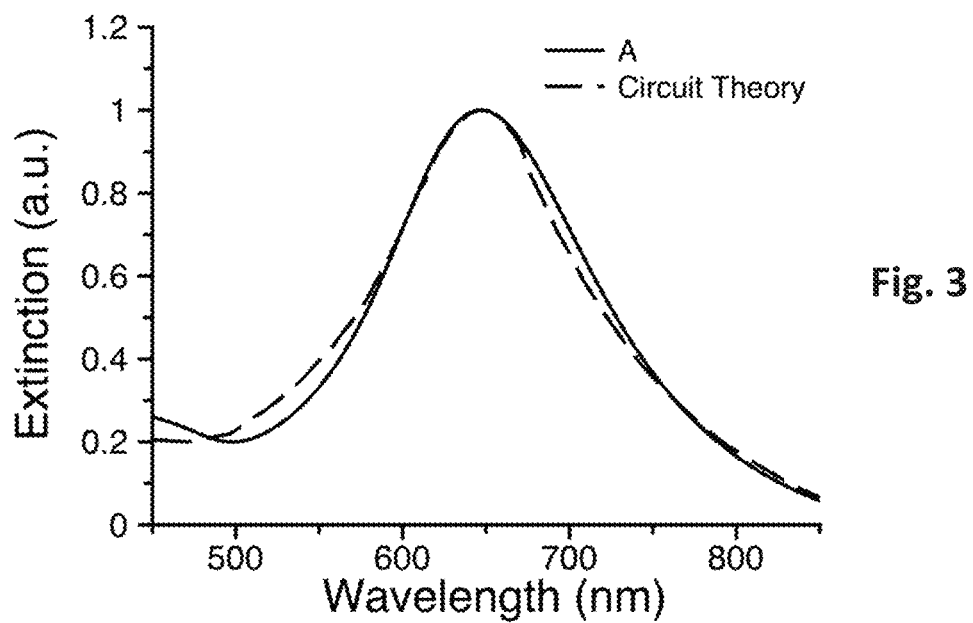
FIGS. 3, 4 and 5 represent a behavior of the plasmonic network prepared according to example 2 and as modeled by optical lumped nanocircuit theory.
Figure 4:
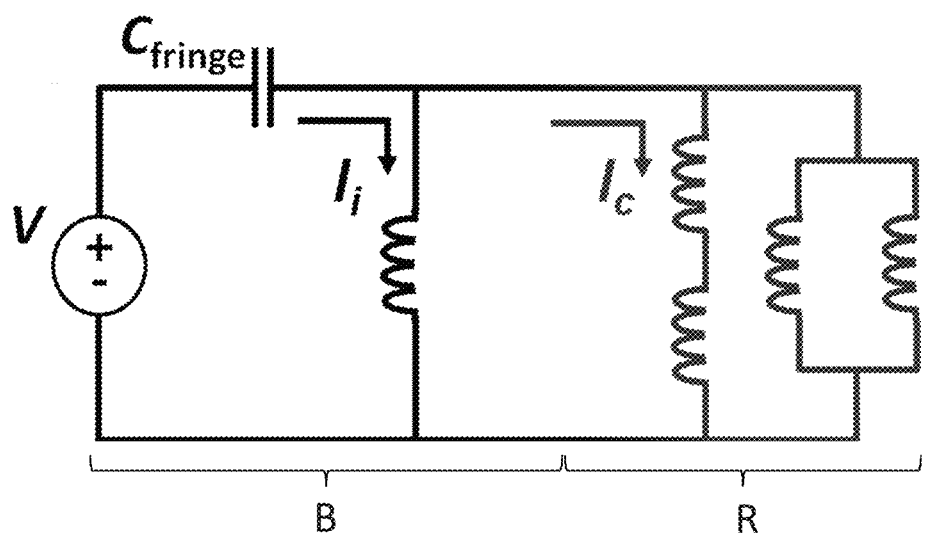
Figure 5:
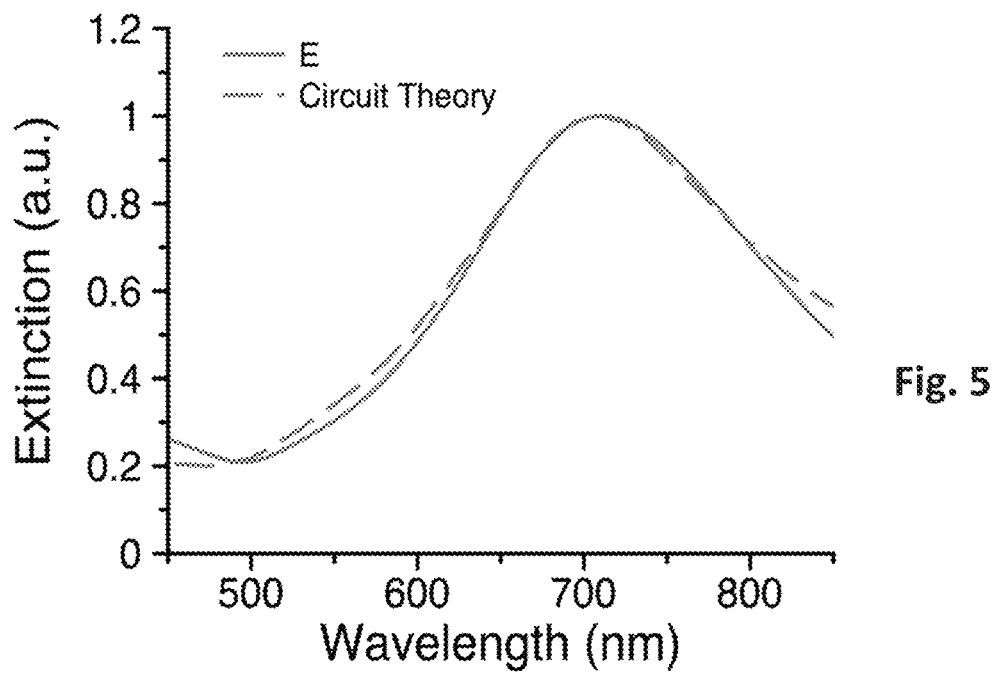

The LC circuit model was applied to our substrates by first fitting the bare gold nanocluster extinction spectrum by adjusting the permittivity of the polymer-supported nanocluster. The value of the inductance element is constant as it is set by the size of the nanoparticle and the dielectric constant of gold, which were taken directly from literature values. A constant value for the resistance in the circuit was applied to achieve the requisite broadening of the peak. Next, the extinction spectrum from the nanoclusters with undoped nanowires was fit to take into account the change in dielectric constant surrounding the nanoparticles. This resulted in a dielectric value of $1.4^{\varepsilon}_{0}$ for the undoped nanowires and a nanocapacitance value of 2.46 attoFarad. The coupling of the plasmonic resonances of two nanoparticles was modeled by placing the inductive elements either in series ($I_s$) or in parallel configuration ($I_p$) and holding the values for the circuit elements constant from the previous fits. Following the literature on the abstraction of circuit theory, we determined that the series configuration corresponds to excitation perpendicular to the axis of connection, while the parallel configuration corresponds to excitation parallel to the axis of connection. This determination of the (series/parallel) between the two orthogonal orientations of the electromagnetic field ($E_x, E_y$) was also supported by theoretical investigations using finite difference time domain (FDTD). FDTD simulations were performed with two gold nanoparticles connected by a nanowire having the permittivity determined by ellipsometry for the attached doped fibers. Propagation was observed along the waveguide when the incident electric field is perpendicular to the wire direction. It was demonstrated that a 10 fs pulse resulted in residual oscillations inside the nanowire for perpendicularly polarized irradiation, whereas no residual oscillations were observed with the parallel oriented light source. Thus, in the abstraction based on the circuit theory, and due to the isotropic nature of our substrate, there should be an even distribution between the two configurations; therefore the total contribution from coupled nanoparticles comes from a linear combination of the two circuits ($I_c = 1/2 \ I_s + 1/2 \ I_p$) as illustrated in FIG. 4. In this model, the plasmonic interconnects are taken to be ideal wires with no impedance contribution. This is based on the extremely high conductivity and low interfacial resistance demonstrated with STANWs over similar distances between electrodes, as well as theoretical studies predicting minimal damping in plasmonic waveguides, especially over short distances.

The red-shift of the extinction spectrum are then dependent on the proportion of current flowing through the isolated nanoparticle circuit ($I_i$) and the connected circuits in the presence of the doped nanowires: $I_{total} = \alpha I_i + \beta I_c$ where $\alpha + \beta = 1$. The coefficients a and b represent the fractions of current flowing through the constituents of the circuit, and are related to the proportion of efficient interconnects. By altering the proportion of current flowing through the two available loops ($I_i$ and $I_c$) the resonance frequency of the circuit is adjusted to fit the spectrum of the doped unattached and doped attached substrates. The circuit model fit of the doped attached substrate led to 90% of the current flowing through loop $I_i$, between connected nanoparticles, and 10% of the current flowing through loop $I_c$, through unconnected nanoparticles. In contrast, the doped unattached substrate exhibited only 25% of the current flowing through the connected nanoparticle loop. This demonstrates that is possible to distinguish, through far-field methods, attached nanowires from unattached nanowires through the circuit theory model, thereby presenting a factor of 3 signal to noise ratio. In the case of the washed substrate, the remaining signal amounts to a percentage of connections between nanoparticles of only 13%, a value in agreement with the statistical ratio measured by AFM imaging.

CONCLUSION

The data presented here demonstrate the coupling of spatially separated plasmonic nanoparticles through the controlled connection of doped supramolecular organic nanowires, thereby acting as subwavelength optical interconnects. Although excitation of the surface plasmon polariton is limited by the large momentum mismatch in such small diameter nanowires, this is overcome by using the nanoparticle as an antenna to launch the plasmon propagation. The nanowires act as conduits for this plasmonic energy allowing for a rapid transfer back and forth between linked nanoparticles. This proof of principle is important because plasmonic interconnects may be required for the development of complex nanocircuit topologies, by solving the problem of undesired displacement current 'leakage' that occurs when nanoparticles are brought in direct contact. Additionally, the self-assembly process through thiol functionalization allows for (1) a facile bottom-up approach to control the placement of the nanowires on the nanometer scale, (2) a noticeable increase in the coupling between the nanowires and the nanoparticles as evidenced by an increase in the optical conductivity from 3193 $\Omega^{-1} \cdot cm^{-1}$ to 4271 $\Omega^{-1} \cdot cm^{-1}$, a 3-fold increase in the dissipation factor, and an increased red-shift of the extinction spectrum of 25 nm. The extinction spectrum was successfully fit using optical nanocircuit theory and the connected versus unconnected substrates could easily be distinguished. Simulations displayed the ability to control the coupling between linked nanoparticles by changing the orientation of the incident light. This is important for future applications as it should allow the circuit to be turned on and off by controlling the orientation of the plasmonic resonance. Furthermore, the organic and self-assembled characters of STANWs open an entirely new field of research towards "plastic" and "supramolecular" plasmonics, providing a large number of opportunities to implement soft and processable 1D, 2D, and 3D nanophotonic devices and metamaterials. In this direction, advanced supramolecular control over the geometry and density of wiring is currently under investigation.

The invention claimed is:

1. An optical conductor, comprising:
   one or more fibrillar organic supramolecular species including an association of triarylamines, and
   nanoparticles of one or more metals or alloys thereof, the nanoparticles forming nanoclusters
   wherein the optical conductor includes nanoparticles of one or more metals or alloys thereof, the nanoparticles forming nanoclusters, each nanocluster including at least partially on its respective outer surface a layer of molecules including triarylamines,
   the nanoclusters are interconnected by the fibrillar organic supramolecular species grafted onto the layers of molecules including triarylamines, and
   the fibrillar organic supramolecular species are oriented in one or more parallel bundles of fibrillar organic supramolecular species.

2. The optical conductor of claim 1, wherein the fibrillar organic supramolecular species are in the form of crystals.

3. The optical conductor of claim 1, wherein the fibrillar organic supramolecular species form parallel nanofibers.

4. The optical conductor of claim 1, wherein the optical conductor includes a plasmonic waveguide including one or more fibrillar organic supramolecular species.

5. The optical conductor of claim 1, wherein the fibrillar organic supramolecular species are in the form of crystals and are oxidized.

6. The optical conductor of claim 1, wherein the optical conductor includes gold nanoparticles forming the nanoclusters, the nanoclusters being interconnected by the fibrillar organic supramolecular species that are oriented in one or more parallel bundles of fibrillar organic supramolecular species.

7. The optical conductor of claim 1, wherein the fibrillar organic supramolecular species present a length of at least 10 nm.

8. The optical conductor of claim 1, wherein the fibrillar organic supramolecular species present a nanofiber diameter of less than 10 nm.

9. The optical conductor of claim 1, wherein the fibrillar organic supramolecular species are in the form of crystals, the crystals presenting a length of at least 1 µm.

10. The optical conductor of claim 1, wherein the triarylamines are tris-amide triarylamines.

11. The optical conductor of claim 1, further including a plasmonic layer having a thickness of at least 10 nm.

12. A hybrid organic-metal device, including:
    the optical conductor as claimed in claim 1.

13. An optical circuit or solar energy conversion device, including:
    the optical conductor as claimed in claim 1.

14. A method for preparing the optical conductor of claim 1, the method including:
    preparing nanoclusters of metallic nanoparticles, the metallic nanoparticles including one or more metals or alloys thereof,
    reacting metallic nanoparticles with triarylamines thereby forming functionalized metallic nanoparticles presenting at least partially on the outer surface a layer of triarylamines oriented parallel to the surface of the metallic nanoparticles,
    preparing fibrillar organic supramolecular species including an association of triarylamines, and
    interconnecting the functionalized metallic nanoparticles by fibrillar organic supramolecular species.

15. A method for preparing an optical conductor of claim 1, the method including:
    preparing a solution including triarylamines and at least one solvent, and
    preparing and crystallizing fibrillar organic supramolecular species including an association of triarylamines by evaporation of at least one solvent thereby preparing crystals of one or more fibrillar organic supramolecular species.

16. A method of using one or more fibrillar organic supramolecular species and/or an association of triarylamines as an optical waveguide, and
    the optical waveguide including the optical conductor of claim 1.

17. A method of using one or more fibrillar organic supramolecular species and/or an association of triarylamines as a plasmonic waveguide, and
the plasmonic waveguide including the optical conductor of claim 1.

18. A device comprising:
nanoclusters; and
nanoparticles of one or more metals or alloys thereof, the nanoparticles forming the nanoclusters,
wherein each nanocluster includes at least partially on its respective outer surface a layer of molecules including triarylamines,
the nanoclusters are interconnected by fibrillar organic supramolecular species grafted onto the layer of molecules including triarylamines, and
the fibrillar organic supramolecular species are oriented in one or more parallel bundles of fibrillar organic supramolecular species.

\* \* \* \* \*